(12) United States Patent
Amano et al.

(10) Patent No.: US 11,192,255 B2
(45) Date of Patent: Dec. 7, 2021

(54) ROBOT HAND, CONTROL METHOD OF ROBOT HAND, AND ROBOT APPARATUS

(71) Applicant: CANON KABUSHIKI KAISHA, Tokyo (JP)

(72) Inventors: Shingo Amano, Kawasaki (JP); Nobuaki Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 15/987,608

(22) Filed: May 23, 2018

(65) Prior Publication Data

US 2018/0345502 A1    Dec. 6, 2018

(30) Foreign Application Priority Data

May 30, 2017    (JP) .............................. JP2017-107063

(51) Int. Cl.
| | | |
|---|---|---|
| G05B 15/00 | (2006.01) | |
| G05B 19/00 | (2006.01) | |
| B25J 9/16 | (2006.01) | |
| B25J 13/08 | (2006.01) | |
| B25J 15/02 | (2006.01) | |
| B25J 15/08 | (2006.01) | |
| B25J 15/10 | (2006.01) | |

(52) U.S. Cl.
CPC .......... *B25J 9/1694* (2013.01); *B25J 9/1633* (2013.01); *B25J 13/082* (2013.01); *B25J 15/026* (2013.01); *B25J 15/08* (2013.01); *B25J 15/103* (2013.01); *G05B 2219/39322* (2013.01); *G05B 2219/39478* (2013.01); *Y10S 901/09* (2013.01); *Y10S 901/39* (2013.01); *Y10S 901/46* (2013.01)

(58) Field of Classification Search
CPC ...... B25J 9/1694; B25J 13/082; B25J 15/103; B25J 9/1633; B25J 15/026; B25J 15/08; G05B 2219/39322; G05B 2219/39478; Y10S 901/39; Y10S 901/46; Y10S 901/09
See application file for complete search history.

(56) References Cited

U.S. PATENT DOCUMENTS

| | | | |
|---|---|---|---|
| 2007/0266781 A1 | 11/2007 | Nemoto | |
| 2011/0015785 A1* | 1/2011 | Tsusaka ................. | B25J 9/0003 700/254 |
| 2011/0190932 A1* | 8/2011 | Tsusaka ................... | B25J 13/08 700/254 |
| 2015/0105907 A1* | 4/2015 | Aiso ...................... | B25J 9/1697 700/259 |
| 2016/0354925 A1* | 12/2016 | Shimodaira ............ | B25J 9/1664 |

FOREIGN PATENT DOCUMENTS

| | | | |
|---|---|---|---|
| CN | 101952087 | A | 1/2011 |
| CN | 102056715 | A | 5/2011 |
| CN | 102773865 | A | 11/2012 |
| CN | 103889202 | A | 6/2014 |
| CN | 105690416 | A | 6/2016 |
| CN | 106239516 | A | 12/2016 |
| JP | 09-044253 | A | 2/1997 |
| JP | 2009202332 | A * | 9/2009 |
| JP | 201069584 | A | 4/2010 |

* cited by examiner

*Primary Examiner* — Harry Y Oh
*Assistant Examiner* — Sohana Tanju Khayer
(74) *Attorney, Agent, or Firm* — Canon U.S.A., Inc. IP Division

(57) ABSTRACT

There is provided a robot hand that grips and positions a work with a certain gripping force, and that rapidly conveys the work to execute assembling after gripping the work.

11 Claims, 15 Drawing Sheets

FIG.4

<table>
<tr><th rowspan="3">GRIPPING INSTRUCTION NUMBER</th><th colspan="4">GENERAL GRIPPING SETTING</th><th colspan="4">J1 SETTING</th><th>J2 SETTING</th></tr>
<tr><th colspan="2">OPENING/CLOSING DRIVING MECHANISM CONTROL MODE</th><th rowspan="2">GRIPPING FORM</th><th rowspan="2">TARGET GRIPPING POSITION Xref1 [mm]</th><th rowspan="2">TARGET GRIPPING FORCE Fref1 [N]</th><th rowspan="2">FORCE CONTROL COMPLETION RANGE εf1 [N]</th><th rowspan="2">NUMBER OF FORCE CONTROL COMPLETION COUNTS Nf1 [-]</th><th rowspan="2">TARGET GRIPPING POSITION Xref2 [mm]</th></tr>
<tr><th>J1</th><th>J2</th></tr>
<tr><td>1</td><td>P</td><td>P</td><td>EXTERNAL GRIPPING</td><td>0</td><td>—</td><td>—</td><td>—</td><td>0</td></tr>
<tr><td>2</td><td>P</td><td>P</td><td>EXTERNAL GRIPPING</td><td>20</td><td>—</td><td>—</td><td>—</td><td>20</td></tr>
<tr><td>3</td><td>F</td><td>P</td><td>EXTERNAL GRIPPING</td><td>—</td><td>5</td><td>1</td><td>3</td><td>20</td></tr>
<tr><td>4</td><td>P</td><td>P</td><td>INTERNAL GRIPPING</td><td>0</td><td>—</td><td>—</td><td>—</td><td>0</td></tr>
<tr><td>⋮</td><td></td><td></td><td></td><td></td><td></td><td></td><td></td><td></td></tr>
</table>

| GRIPPING INSTRUCTION NUMBER | GENERAL GRIPPING SETTING | | | | | J1' SETTING | | | J2' SETTING | | | J3' SETTING | | |
|---|---|---|---|---|---|---|---|---|---|---|---|---|---|---|
| | OPENING/ CLOSING DRIVING MECHANISM CONTROL MODE | | | GRIPPING FORM | TARGET GRIPPING POSITION Xref1 [mm] | TARGET GRIPPING FORCE Fref1 [N] | FORCE CONTROL COMPLETION RANGE εf1 [N] | NUMBER OF FORCE CONTROL COMPLETION COUNTS Nf1 [-] | TARGET GRIPPING POSITION Xref2 [mm] | TARGET GRIPPING FORCE Fref2 [N] | FORCE CONTROL COMPLETION RANGE εf2 [N] | NUMBER OF FORCE CONTROL COMPLETION COUNTS Nf2 [-] | TARGET GRIPPING POSITION Xref3 [mm] | TARGET GRIPPING FORCE Fref3 [N] | FORCE CONTROL COMPLETION RANGE εf3 [N] | NUMBER OF FORCE CONTROL COMPLETION COUNTS Nf3 [-] |
| | J1 | J2 | J3 | | | | | | | | | | | | | |
| 1 | P. | P. | P. | EXTERNAL GRIPPING | 0 | — | — | — | 0 | — | — | — | 0 | — | — | — |
| 2 | P. | P. | P. | EXTERNAL GRIPPING | 20 | — | — | — | 20 | — | — | — | 20 | — | — | — |
| 3 | F. | F. | F. | EXTERNAL GRIPPING | — | 5 | 1 | 3 | — | 5 | 1 | 3 | — | 5 | 1 | 3 |
| 4 | P. | P. | P. | INTERNAL GRIPPING | 0 | — | — | — | 0 | — | — | — | 0 | — | — | — |
| ... | | | | | | | | | | | | | | | | |

511'

ROBOT HAND, CONTROL METHOD OF ROBOT HAND, AND ROBOT APPARATUS

BACKGROUND

Field of the Disclosure

The present disclosure relates to a robot hand capable of gripping a work with a certain gripping force and rapidly switching its operation to a conveyance operation without causing positional deviation, and a control method of the robot hand.

Description of the Related Art

In recent years, in order to achieve automatization, manpower saving, and improvement in efficiency of operations, automated assembling work using robots has become popular in production lines of factories. In a production line, a robot system configured of a combination of a robot arm and a gripping mechanism, i.e., a multi-joint arm and a robot hand, has been used. In the above-described assembling work using a robot system, a work has to be gripped without slippage and conveyed to an assembling position by a robot hand. Therefore, the work has to be gripped with a certain gripping force while being positioned, and a time taken by the robot hand to execute assembling after starting gripping operation should desirably be reduced.

As an example of a method of gripping and positioning the work with a certain gripping force, a method of stably gripping a work by switching a control mode of gripping fingers between position control and force control according to a value of a force sensor attached to a robot hand has been discussed in Japanese Patent Application Laid Open No. 2010-69584. In this method, positioning of the work is realized by the position control, and gripping of the work at a certain gripping force is realized by the force control.

In a method discussed in Japanese Patent Application Laid-Open No. 09-044253, an actuator for driving a robot hand switches speed control to torque control. As a method for smoothly realizing switching between different control modes, target values of the torque and the speed are calculated to make the instruction values with respect to the motor immediately before and after executing switching approximately coincide with each other. With this method, switching can be executed smoothly without causing a sudden change in the instruction value of the motor.

SUMMARY

According to an aspect of the present disclosure, a robot hand for gripping a target object with a plurality of gripping portions includes a force control unit configured to control gripping force of the gripping portions with respect to the target object, a position control unit configured to control gripping positions of the gripping portions with respect to the target object, a storage unit configured to store a gripping force control value of the force control unit, and a control switching unit capable of switching between force control executed by the force control unit and position control executed by the position control unit, wherein, when the control switching unit switches the force control to the position control, the position control is executed in a state where the gripping force control value immediately before switching, which is stored in the storage unit, is applied to each of the gripping portions.

Further features of the present disclosure will become apparent from the following description of exemplary embodiments with reference to the attached drawings.

BRIEF DESCRIPTION OF THE DRAWINGS

FIG. 4 is a diagram illustrating an example of a gripping instruction table according to one or more aspects of the present disclosure.

FIG. 12 is a diagram illustrating an example of a gripping instruction table according to one or more aspects of the present disclosure.

DESCRIPTION OF THE EMBODIMENTS

However, in the gripping method discussed in Japanese Patent Application Laid-Open No. 2010-69584, a control value by the force control becomes 0 when the force control is switched to the position control. Therefore, a gripping portion is pushed back because of the rigidity of the work, so that fluctuation arises in the gripping force generated thereby. As a result, in order to generate a gripping force equivalent to that of the force control in the position control, it is necessary to wait until the deviation arising in the position control is accumulated in an integrator of the position control as an integrated value, so that it is problematic in that shifting from the force control to position control requires time.

Further, in the method discussed in Japanese Patent Application Laid-Open No. 09-044253, an instruction value with respect to the motor has to be shifted gradually when switching is to be performed. Therefore, similar to the method discussed in Japanese Patent Application Laid-Open No. 2010-69584, it is problematic in that shifting of instruction values requires time.

In consideration of the above-described problems, the present disclosure is directed to a robot hand capable of gripping and positioning a work with a certain gripping force and rapidly switching the gripping operation to the conveyance operation, and a control method of the robot hand.

Hereinbelow, exemplary embodiments implementing the present disclosure will be described in detail with reference to the appended drawings. Further, exemplary embodiments described below are merely examples, and details of the configuration may be changed within the range of not departing from the essential spirit of the present disclosure. Further, numerical values described in each of the exemplary embodiments are reference numerical values and not intended to limit the scope of the present disclosure.

Figure 1:
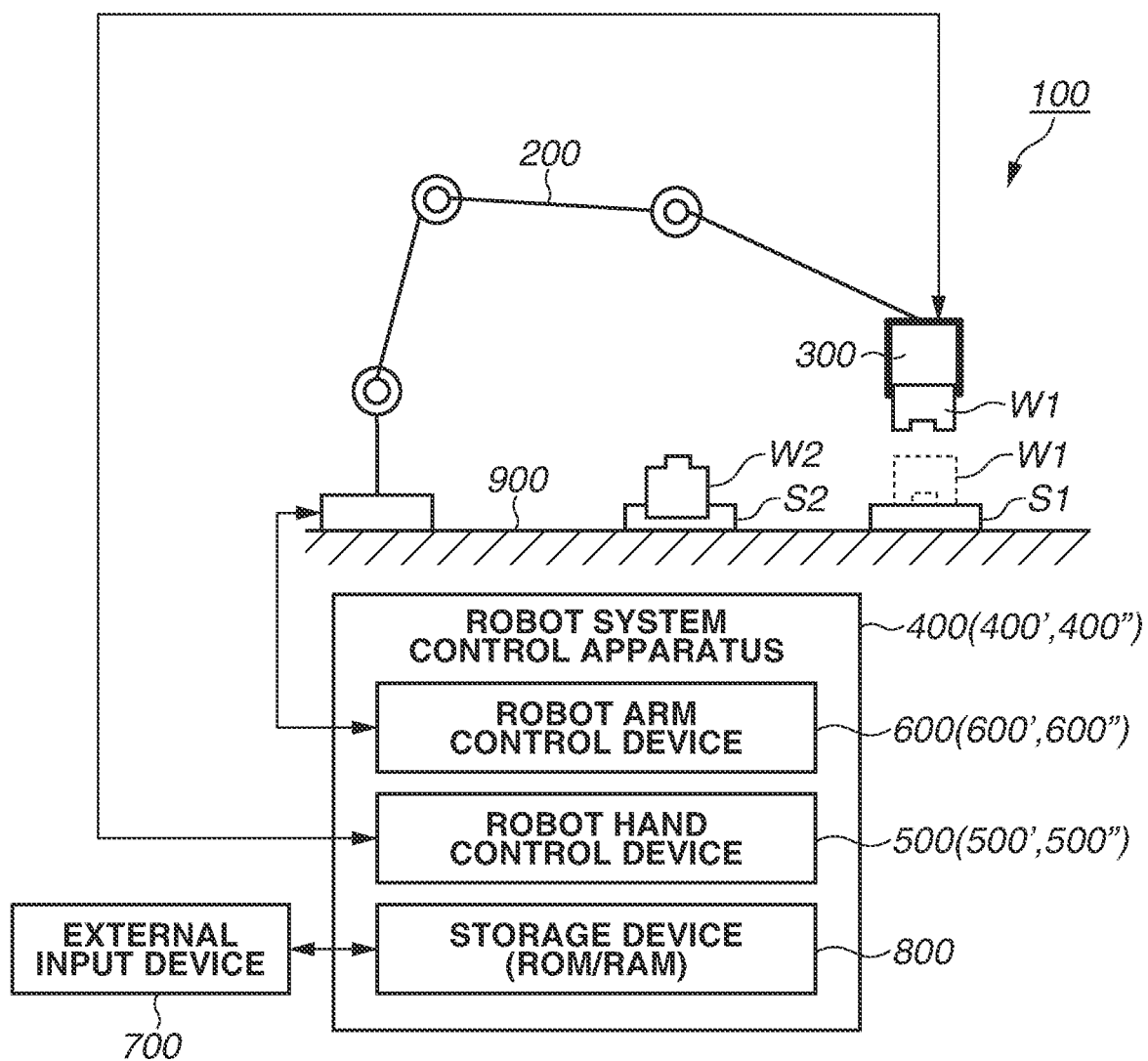
FIG. 1 is a diagram illustrating a schematic configuration of a robot system according to one or more aspects of the present disclosure.

A first exemplary embodiment of the present disclosure will be described with reference to FIGS. 1 to 9. FIG. 1 is a diagram illustrating a schematic configuration of a robot system using a robot hand according to the present exemplary embodiment.

In FIG. 1, a robot system 100 according to the present exemplary embodiment is configured of a robot arm main body 200, a robot hand main body 300, and a robot system control apparatus 400 for controlling the entire robot system 100. The robot system 100 further includes an external input device 700 for externally teaching a moving position or a moving route of the robot hand main body 300 by using the robot arm main body 200.

The robot system control apparatus 400 includes a robot arm control device 600 for controlling the robot arm main body 200, a robot hand control device 500 for controlling the robot hand main body 300, and a storage device 800 for storing various control programs and data. These devices respectively drive and control the robot arm main body 200 and the robot hand main body 300 to grip a work W1 as an assembling part placed on a work placement table S1 and convey the work W1 to a work W2 as an assembling target object fixed on a work fixing table S2. In the present exemplary embodiment, the above configuration is applicable when operation of gripping the work W1 is shifted to operation of conveying the work W1 to the work W2. A work placement table S1 and a work fixing table S2 are provided on a work bench 900.

The robot system control apparatus 400, i.e., the robot arm control device 600 or the robot hand control device 500, includes a central processing unit (CPU) configured of a microprocessor. The storage device 800 includes a read only memory (ROM) for storing a program for controlling a corresponding driving unit according to various operations of the robot system 100 and data necessary for controlling the driving unit, and data, setting values, or programs necessary for controlling the robot system 100 are loaded thereon. The storage device 800 further includes a random access memory (RAM) used as a work area of the CPU. An external device such as the external input device 700 is connected thereto through a general-purpose input/output interface I/O (not illustrated).

In the present exemplary embodiment, the robot arm main body 200 is a multi-joint robot arm. A base of the robot arm main body 200 is fixed to a base plate, and the robot hand main body 300 serving as an end effector is attached to a leading end of the robot arm main body 200. Gripping operation is executed on the work W1 via the robot hand main body 300. Further, a motor (not illustrated) serving as a driving source for driving a joint and an encoder (not illustrated) serving as a detection unit for detecting a rotation angle of the motor are arranged on each of the joints.

The robot arm control device 600 calculates an angle to be formed by each of the joints of the robot arm main body 200 with respect to a target position and an orientation of a leading end of the robot arm main body 200. Then, the robot arm control device 600 outputs an instruction value to a servo circuit (not illustrated) that controls motors of the joints to drive and control the joints of the robot arm main body 200. Through the above control, the robot arm control device 600 can convey the work W1 gripped by the robot hand main body 300 to the target position and execute assembling.

Figure 2:
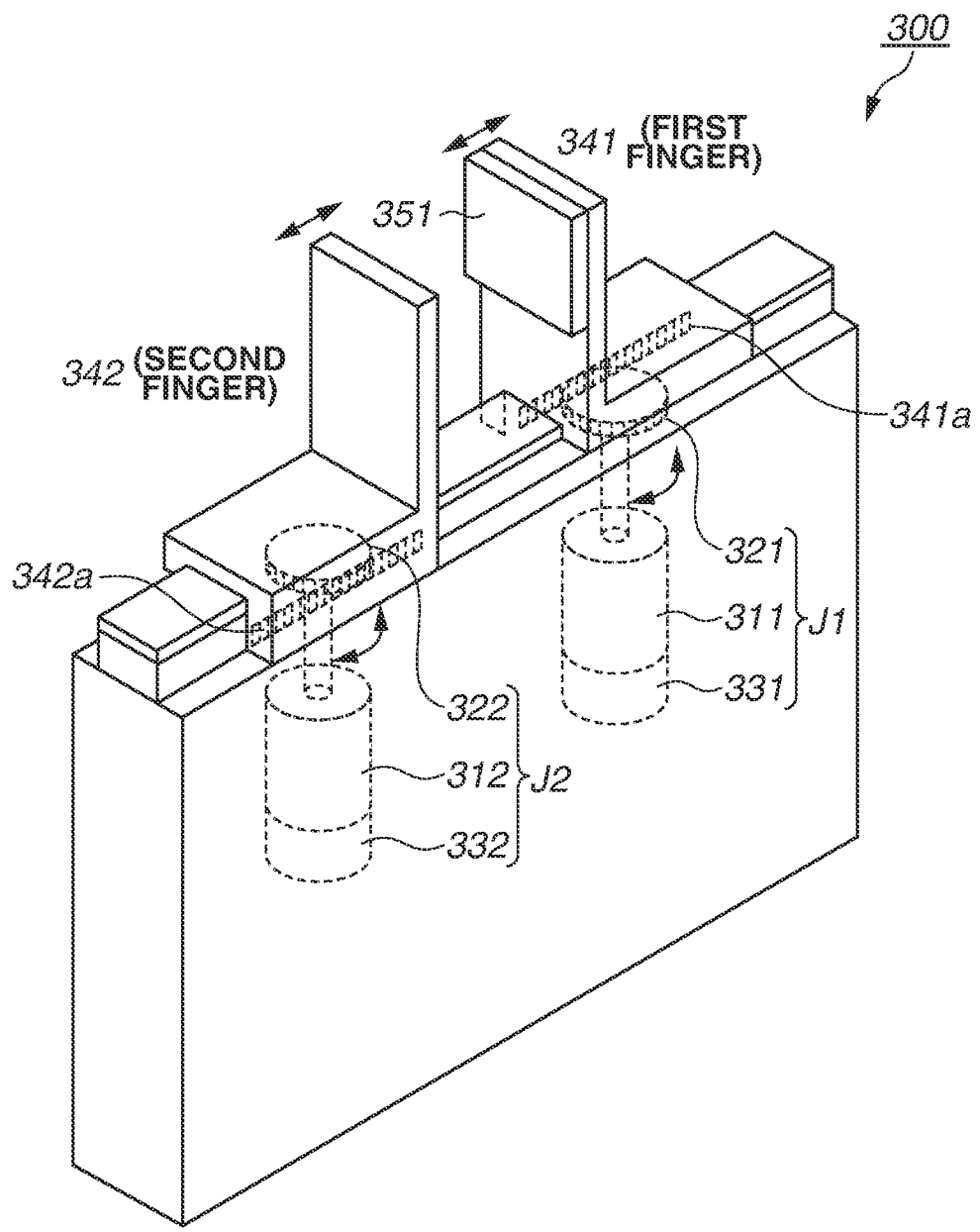
FIG. 2 is a diagram illustrating a schematic configuration of a robot hand according to one or more aspects of the present disclosure.

FIG. 2 is a diagram illustrating a schematic configuration of the robot hand main body 300. The robot hand main body 300 includes two gripping fingers 341 and 342, and opening/closing driving mechanisms J1 and J2. These gripping fingers 341 and 342 function as gripping portions for gripping a target object, and are used for gripping the work W1. Motors 311 and 312 serving as driving units for respectively driving the opening/closing driving mechanisms J1 and J2 are provided on the opening/closing driving mechanisms J1 and J2 of the robot hand main body 300, and gears 321 and 322 constantly engaging with racks 341a and 342a formed on the gripping fingers 341 and 342 are directly connected to respective rotation shafts. The motors 311 and 312 are rotated to cause the gripping fingers 341 and 342 to open or close, so that the work W1 can be gripped thereby. Further, encoders 331 and 332 for detecting respective rotation angles of the motors 311 and 312 are arranged on the motors 311 and 312. Positions of the gripping fingers 341 and 342 can be acquired from the rotation angles of the motors 311 and 312 detected by the encoders 331 and 332, respectively.

Further, a force sensor 351 operating as a detection unit for detecting the gripping force is arranged on a gripping face at the leading end of the gripping finger 341 (first finger) to contact the work W1, so that external force in the gripping direction applied to the gripping finger 341 (i.e., reaction force received from the work W1 when gripping the work W1) can be detected thereby. In other words, the force sensor 351 operates as a gripping force detection unit.

As described above, the robot hand control device 500 is configured of the CPU and included in the system control apparatus 400. A functional configuration thereof is illustrated as a block diagram in FIG. 3.

Figure 3:
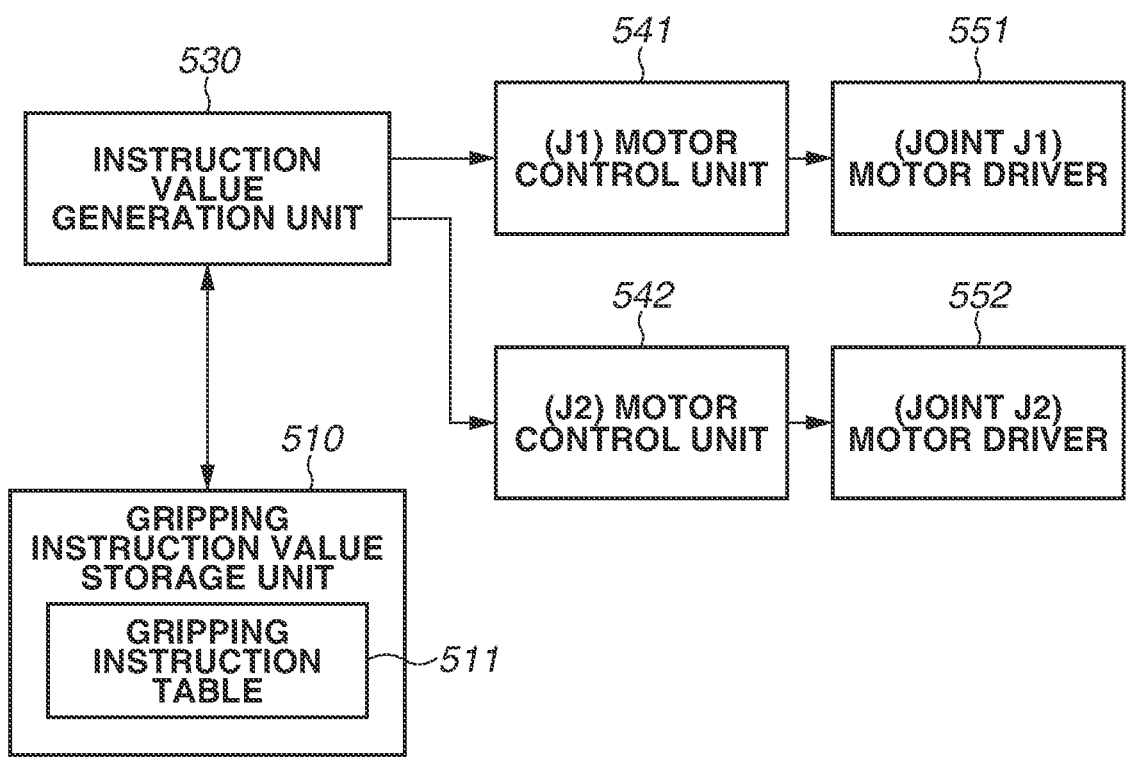
FIG. 3 is a block diagram illustrating general control of the robot hand according to one or more aspects of the present disclosure.

FIG. 3 is a schematic block diagram illustrating a configuration of the robot hand control device 500. The robot hand control device 500 is configured of an instruction value generation unit 530, motor control units 541 and 542 for driving and controlling the motors 311 and 312 for the opening/closing driving mechanisms J1 and J2, and motor drivers 551 and 552 for driving the motors 311 and 312 based on the control values output from the motor control units 541 and 542.

Further, a gripping instruction table 511 is stored in the gripping instruction value storage unit 510, and the gripping instruction value generation unit 530 refers to the gripping instruction table 511 to determine various parameters used for driving control based on the instructions with respect to the gripping fingers 341 and 342 of the robot hand main body 300.

Here, contents of the gripping instruction table 511 will be described with reference to FIG. 4. FIG. 4 is a diagram illustrating an example of the gripping instruction table 511 of the present exemplary embodiment. In the gripping instruction table 511, an opening/closing driving mechanism control mode and a gripping form previously defined at each of gripping instruction numbers is set as general gripping settings. Further, items such as a target gripping position, a target gripping force, a force control completion range, a number of force control completion counts are respectively set to the opening/closing driving mechanisms J1 and J2. The target gripping position, the target gripping force, the force control completion range, and the number of force control completion counts are set to the opening/closing driving mechanism J1. The target gripping position is set to the opening/closing driving mechanism J2.

In the opening/closing driving mechanism control mode, either the position control or the force control is set with respect to which motors of the opening/closing driving mechanisms J1 and J2. An opening/closing driving mechanism controlled by the position control is expressed by a symbol "P", and an opening/closing driving mechanism controlled by the force control is expressed by a symbol "F", and sequence of the symbols "P" and "F" is associated with the gripping instruction number of each of the opening/closing driving mechanisms J1 and J2. In the present exemplary embodiment, the following two types are set as the opening/closing driving mechanism control modes. Specifically, [PP (all of the opening/closing driving mechanisms J1 and J2 are controlled by position control)] and [FP (only the opening/closing driving mechanism J1 is controlled by force control, and the opening/closing driving mechanism J2 is controlled by position control)] are provided. Any one of external gripping and internal gripping is set as the gripping form. The external gripping refers to a gripping form in which the work W1 is gripped from the outside of the work W1, and the internal gripping refers to a gripping form in which the work W1 is gripped from the inside of the work W1.

A value corresponding to a gripping stroke is set to the target gripping position of each of the opening/closing driving mechanisms J1 and J2. A value corresponding to the gripping force to be generated when the work W1 is gripped is set to the target gripping force of each of the opening/closing driving mechanisms J1 and J2. In the gripping processing described below, the force control completion range and the number of force control completion counts of each of the opening/closing driving mechanisms J1 and J2 are used as the setting parameters for determining completion of the force control. The force control completion range is a range for determining the force control to be completed with respect to the target gripping force. For example, if the target gripping force is 5N and the force control completion range is 1N, the force control is determined to be completed if the force sensor value falls within a range of 5±1N, i.e., 4N to 6N. The number of force control completion counts specifies a number of times the value of the gripping force detected by the force sensor 351 should consecutively fall within the force control completion range during a force control period, to determine the completion of the force control. The number of force control completion counts can be set within a range of 3 to 20 because the force becomes stable in that range empirically. In the present exemplary embodiment, it is assumed that the force control can be set with respect to only the opening/closing driving mechanism J1.

Based on the gripping instruction and the gripping instruction table 511, the instruction value generation unit 530 provides, to each of the motor control units 541 and 542, an instruction value of the opening/closing driving mechanism control mode, instruction values of the target gripping position, the target gripping force, the power control completion range, and the number of force control completion counts, to drive each of the motors 311 and 312.

More specifically, if the opening/closing driving mechanism control mode of each of the motors 311 and 312 is the position control, the target gripping position is provided to the motor control units 541 and 542. Further, if the opening/closing driving mechanism control mode of each of the motors 311 and 312 is the force control, the target gripping force, the force control completion range, and the number of force control completion counts are provided to the motor control units 541 and 542.

In the present exemplary embodiment, either the position control or the force control can be selected as the control mode of the motor 311 of the opening/closing driving mechanism J1, and only the position control can be selected as the control mode of the motor 312 of the opening/closing driving mechanism J2. This is because the force sensor is not arranged on the gripping finger 342 driven by the opening/closing driving mechanism J2. Then, according to the target value received from the instruction generation unit 530, the motor control units 541 and 542 output control values of the respective motors 311 and 312 to the motor drivers 551 and 552.

Figure 5:
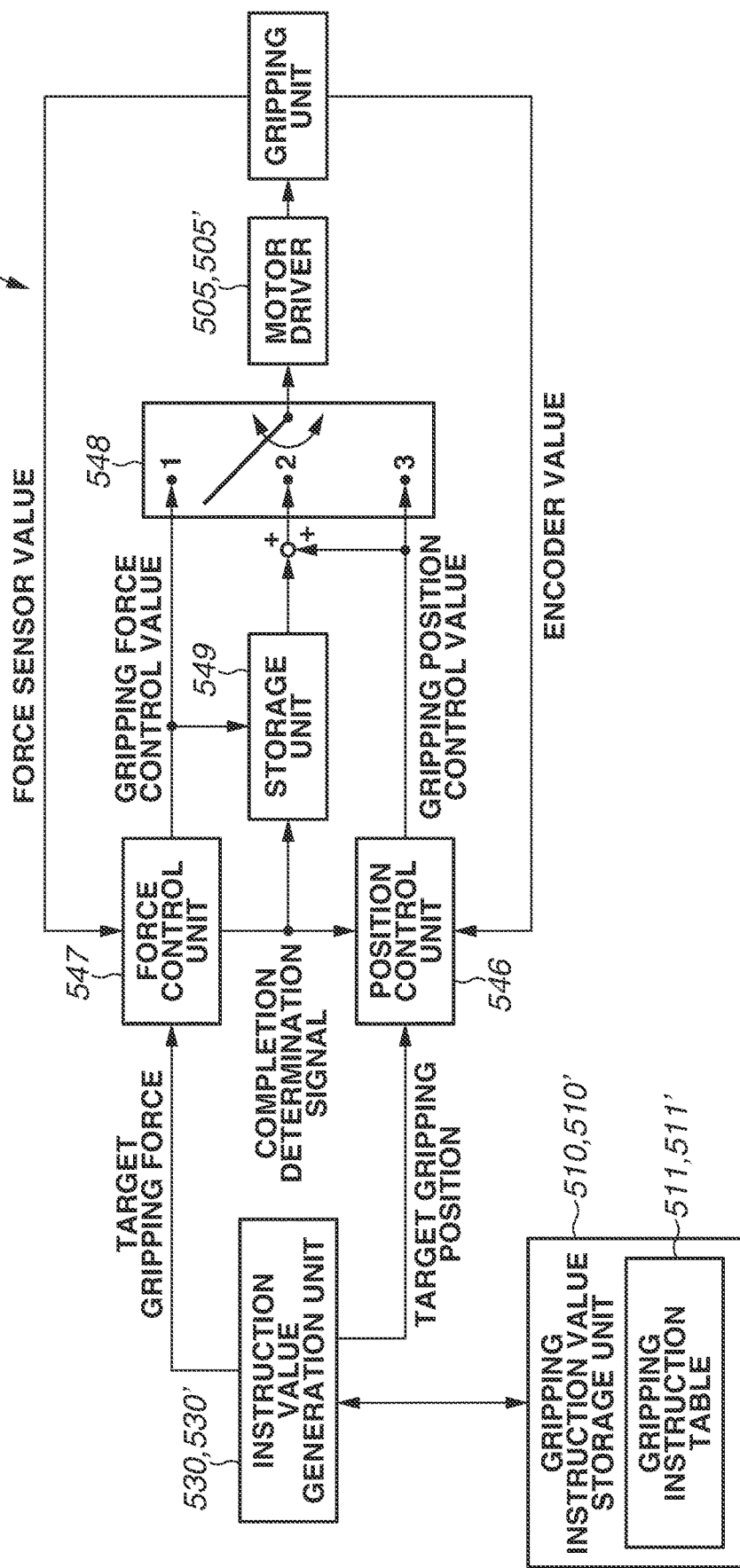
FIG. 5 is a block diagram of a motor control unit according to one or more aspects of the present disclosure.

FIG. 5 is a block diagram illustrating a configuration and an operation of the motor control units 541 and 542.

Because functions of the motor control unit 541 and 542 are substantially similar to each other, the motor control unit 541 of the opening/closing driving mechanism J1 will be described as an example.

In FIG. 5, if the opening/closing driving mechanism control mode of the motor 311 is the position control, the position control unit 546 executes feedback control based on the target gripping position and a value received from the encoder 331, and outputs a gripping position control value to the motor driver 505. If the opening/closing driving mechanism control mode of the motor 311 is the force control, the force control unit 547 executes feedback control based on the target gripping force and a value received from the force sensor 341, and outputs a gripping force control value to the motor driver 505.

The storage unit 549 is configured of a RAM, and based on the below-described gripping processing procedure, the storage unit 549 stores a gripping force control value output from the force control unit 547 when a completion determination signal from the force control unit 547 has become ON.

Based on the opening/closing driving mechanism control mode with respect to the motor 311 and the below-described gripping processing procedure, the control switching unit 548 selects any one of a contact point 3 connected with the position control unit 546, a contact point 1 connected with the force control unit 547, and a contact point 2 connected with the position control unit 546 and the storage unit 549.

If a contact point of the control switching unit 548 is switched to the contact point 1, the gripping force control value received from the force control unit 547 is output from the control switching unit 548, and force control is executed.

If the contact point of the control switching unit 548 is switched to the contact point 2, a sum of the gripping position control value from the position control unit 546 and the gripping force control value from the storage unit 549 is output from the control switching unit 548, and position control is executed.

If the contact point of the control switching unit 548 is switched to the contact point 3, the gripping position control value from the position control unit 546 is output from the control switching unit 548, and position control of the gripping finger is executed.

By executing the above-described control, when the force control for applying the target gripping force to the gripping finger is switched to the position control for setting the gripping finger to the target position, the control can be switched to the gripping control for only executing the position control while maintaining the gripping force control value (i.e., gripping force) immediately before executing the switching.

In the actual operation of the robot arm, the work W1 has an attaching portion (concave portion) to which the work W2 is attached. Further, the work W2 includes an attaching portion (convex portion) to which the work W1 is attached. Herein, a gripping processing method of the work W1 of the robot hand control device 500 of the present exemplary embodiment will be described. As a prerequisite, it is assumed that the processing is started in a state where the robot arm main body 200 and the robot hand main body 300 are moved to a position just before the gripping position of the work W1. Further, it is assumed that the second finger on which the force control is not executed has already been positioned, and the gripping finger 341 grips the work W1 through the force control executed in the gripping processing described below.

A procedure of the gripping processing executed by the robot hand control device 500 will be described with reference to the flowchart in FIG. 6. For example, the gripping processing will be described with respect to the case where the work W1 is gripped according to the gripping instruction number 3 described in the gripping instruction table 511.

First, in step S11, the robot hand control device 500 switches the control switching unit 548 to the contact point 1 to execute force control. As illustrated in FIG. 4, the target gripping force is 5N. The gripping force control value output from the force control unit 547 is used as the control value output from the control switching unit 548.

In step S12, the force control unit 547 determines whether a difference between the target gripping force and a value detected by the force sensor 351 consecutively falls within a range (threshold range) corresponding to the force control completion range for a predetermined number of times. As illustrated in FIG. 4, the force control completion range is 1N, and the number of the force control completion counts is 3. Thus, the force control unit 547 determines whether a difference between the target gripping force and the detection value of the force sensor 351 falls within a range (force control completion range) of ±1N for consecutive three control periods (number of force control completion counts). If the difference with the detection value detected by the force sensor 351 falls within the above-described range for a predetermined number of times (YES in step S12), force control is determined to be completed, and a completion determination signal is shifted to ON and output from the force control unit 547. Then, the processing proceeds to step S13. If the difference does not fall within the range (NO in step S12), the processing returns to step S11. In step S13, when the completion determination signal is shifted to ON, the storage unit 549 stores the gripping force control value output from the force control unit 547.

In step S14, the robot hand control device 500 switches the control switching unit 548 to the contact point 2 and executes position control. At this time, the target gripping position of the position control unit 546 is switched to a current position detected by the encoder at the time when the completion determination signal is shifted to ON. With this processing, an input of the contact point 2, i.e., a sum of the gripping force control value stored in the storage unit 549 and the gripping position control value output from the position control unit 546, is output from the control switching unit 548 as the control value. Further, because the fluctuation of the gripping force is decreased to a level within a predetermined force completion range, a timing at which the processing is shifted to step S14 can be regarded as a timing at which the gripping control is completed.

As described above, according to the robot hand control device 500 described in the present exemplary embodiment, when the gripping control for only executing the force control is switched to the gripping control for only executing the position control, the position control is executed in a state where the gripping force corresponding to the gripping force control value stored when the a desired gripping force is acquired in the force control is applied to the work. By executing such control, fluctuation arising in the gripping force can be reduced and stabilized when the gripping control for only executing the force control is switched to the gripping control for only executing the position control in the work gripping control. Therefore, time taken for executing the processing for shifting the force control to the position control is not required, so that the work can be conveyed immediately after being gripped. Further, even if the work is accelerated during the conveyance operation, assembling can be performed at a correct gripping position because the work is positioned through the position control and stably gripped without positional deviation.

Figure 6:
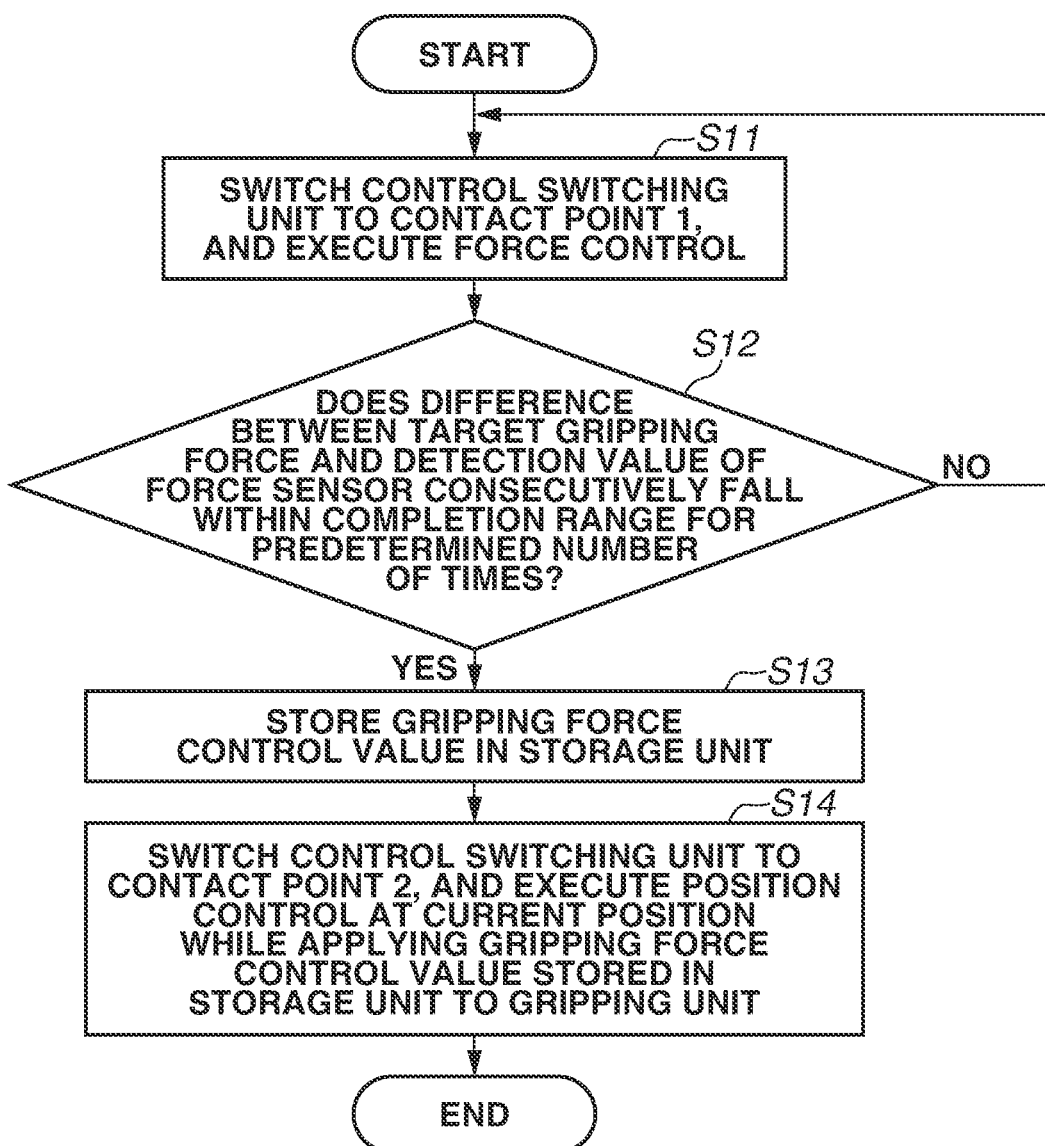
FIG. 6 is a flowchart illustrating a procedure of gripping processing according to one or more aspects of the present disclosure.
Figure 7:
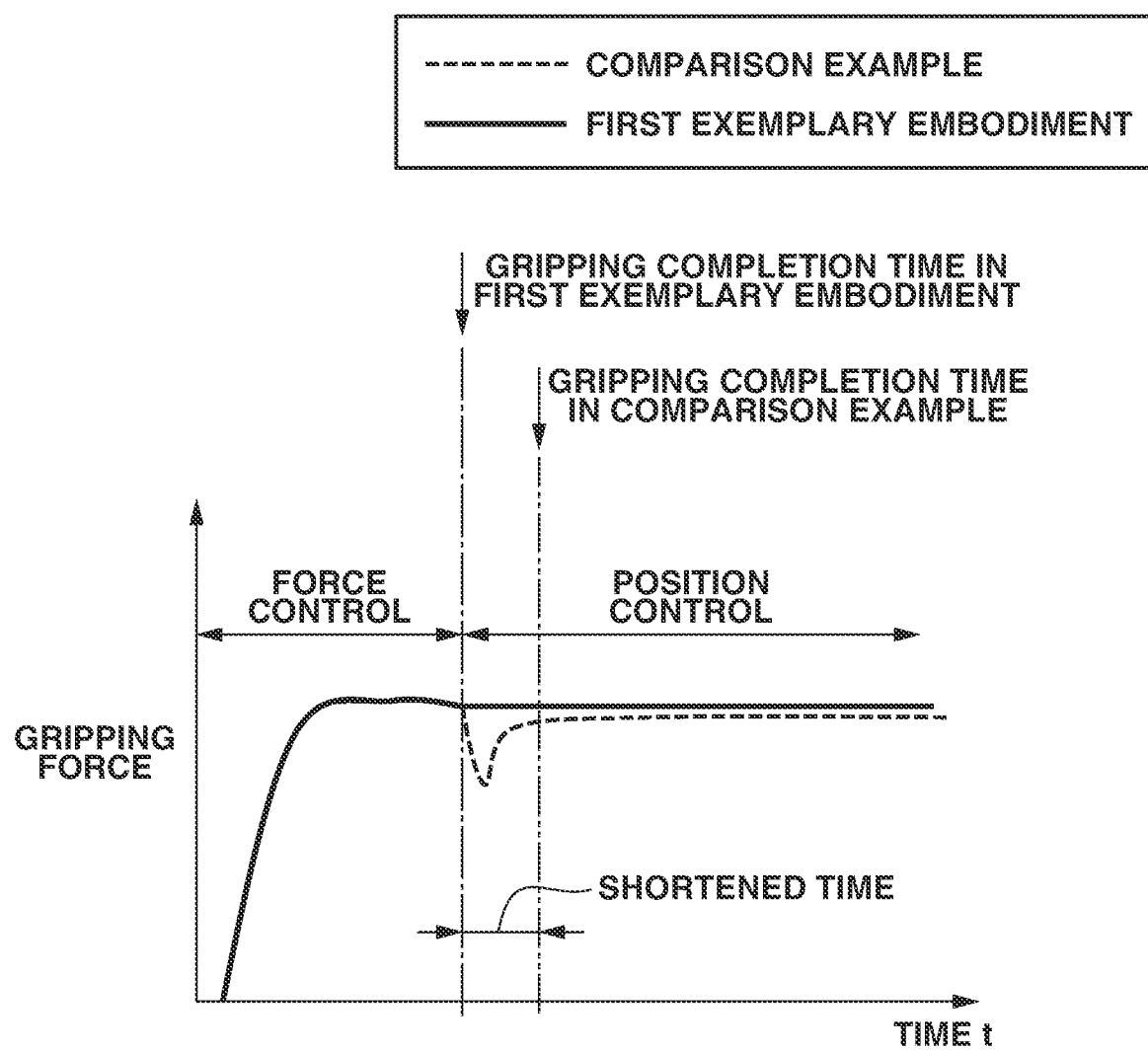
FIG. 7 is a graph illustrating a time history responses of a gripping force according to one or more aspects of the present disclosure.

FIG. 7 is a graph illustrating a time history response of the gripping force in the first exemplary embodiment and a comparison example. Herein, the first exemplary embodiment corresponds to a case where the gripping processing is executed as described above. On the other hand, the comparison example corresponds to a case where the processing in step S13 in FIG. 6 is skipped, and the contact point is switched to the contact point 3 instead of the contact point 2 in step S14. In other words, the gripping control for only executing the force control is simply switched to the gripping control for only executing the position control.

As illustrated in FIG. 7, in the first exemplary embodiment, time taken for completing the gripping control can be reduced in comparison with the comparison example. According to an experiment, it is found that time taken for completing the gripping control can be reduced by approximately 0.1 second. In the comparison example, a gripping force control value of the force control becomes 0 because the gripping control for only executing the force control is directly switched to the gripping control for only executing the position control. Therefore, a tip of the gripping finger is pushed back because of the rigidity of the work, so that fluctuation arises in the gripping force. Therefore, although the position control unit 546 functions to retrieve the original position and the gripping force, it will take time to set the deviation to 0 to complete the gripping operation.

On the other hand, in the first exemplary embodiment, "a gripping control value immediately before switching the force control to the position control" stored in the storage unit 549 is set as an initial value of the position control. As a result, the force control can be shifted to the position control while applying the force to the work. Therefore, fluctuation of the gripping force can be minimized, and thus the gripping operation can be completed within a short period of time.

In addition, although the number of force control completion counts described in the gripping instruction table 511 may be set by the user, the number thereof can be automatically set by the following method.

In the following description, a method of automatically setting the number of force control completion counts will be described with reference to the flowchart in FIG. 8 and a diagram in FIG. 9 that chronologically illustrates a time history response of the gripping force detected by the force sensor 351. In FIG. 9, black dots represent an actual detected waveform, and white dots represent an estimated waveform. A number of dots corresponds to a number of times the gripping force is detected. As a prerequisite, it is assumed that the processing is started in a state where the robot arm main body 200 and the robot hand main body 300 are moved to a position just before a gripping position of the work W1. Further, it is assumed that the gripping finger 342 as the second finger has already been positioned, and the gripping finger 341 as the first finger grips the work W1 through the force control executed in the gripping processing described below.

Hereinafter, the present exemplary embodiment will be described with reference to the flowchart in FIG. 8. First, in step S21, the robot hand control device 500 sets a parameter for automatically setting the number of force control completion counts. The parameter may be a gripping instruction number or a range to be taken as the number of force control completion counts. The parameters are input by an external personal computer (PC) (not illustrated) or the external input device 700 via a general purpose signal interface (not illustrated) of the robot system control apparatus 400 or the robot hand control device 500. Further, values of the gripping operation associated with the gripping instruction number are previously input to the gripping instruction table 511 other than the number of force control completion counts.

In step S22, execution of the gripping operation is started based on the set gripping instruction number. This gripping operation is executed until the operation is ended in step S27.

In step S23, from the force sensor value detected by the force sensor 351, the robot hand control device 500 determines whether the gripping finger is in contact with the work. For example, if a value greater than 10% or more of the target gripping force is detected by the force sensor 351, the gripping finger is determined to be in contact with the work. If the work is determined to be in contact with the work (YES in step S23), from that point in time, the robot hand control device 500 starts recording a time history response of the detection value of the force sensor 351 in the storage unit 549 as a log, and the processing proceeds to step S24. If the gripping finger is determined not to be in contact with the work (NO in step S23), the processing returns to a starting state of step S23, and the gripping operation is executed continuously.

In step S24, the robot hand control device 500 determines whether a difference between the target gripping force and a value detected by the force sensor 351 falls within the force control completion range (threshold range). If the difference is determined to fall within the range (YES in step S24), the processing proceeds to step S25. If the difference is determined to fall outside the range (threshold value) (NO in step S24), the processing returns to a starting state of step S24, and the gripping operation is executed continuously.

In step S25, a frequency of oscillation of the gripping force waveform is specified from the time history response of the force sensor value that has been recorded from a time point in step S23. In the present exemplary embodiment, a frequency of oscillation of the gripping force waveform is specified through the following method. As a prerequisite, it is assumed that the gripping force waveform does not have an offset with respect to the target gripping force, and a response thereof can be approximated by a secondary system. At this time, a gripping model can be expressed by a motion equation of a simple spring-mass-damper system as follows.

$$ma + cv + k(x - x_0) = f \quad \text{Formula 1}$$

Herein, "m" represents a mass, "c" represents a viscosity coefficient, "k" represents a spring constant, "a" represents an acceleration rate of the gripping finger, "v" represents a speed of the gripping finger, "x" represents a displacement of the gripping finger, "$x_0$" represents a balancing point of a spring, and "f" represents a gripping force. Herein, a speed v(i) and an acceleration rate a(i) of the i-th sample (number of counts) are discretized through backward difference to be expressed by the following formulas.

$$v(i) = \frac{x(i) - x(i-1)}{T_s} \quad \text{Formula 2}$$

$$a(i) = \frac{x(i) - 2x(i-1) + x(i-2)}{T_s^2} \quad \text{Formula 3}$$

In addition, "Ts" is a control period of the robot hand control device 500, and a value x(0) satisfies a condition "x(0)=x(−1)=x(1)". A motion equation of the i-th sample is expressed by the following formula from the formula 1.

$$[a(i) \ v(i) \ x(i) \ -1] \begin{bmatrix} m \\ c \\ k \\ kx_0 \end{bmatrix} = f(i) \quad \text{Formula 4}$$

When responses of the 1st to the n-th samples are acquired, the motion equation can be expressed by the following formula.

$$\begin{bmatrix} a(1) & v(1) & x(1) & -1 \\ \vdots & \vdots & \vdots & \vdots \\ a(n) & v(n) & x(n) & -1 \end{bmatrix} \begin{bmatrix} m \\ c \\ k \\ kx_0 \end{bmatrix} = \begin{bmatrix} f(1) \\ \vdots \\ f(n) \end{bmatrix} \quad \text{Formula 5}$$

$$A = \begin{bmatrix} a(1) & v(1) & x(1) & -1 \\ \vdots & \vdots & \vdots & \vdots \\ a(n) & v(n) & x(n) & -1 \end{bmatrix}, \theta = \begin{bmatrix} m \\ c \\ k \\ kx_0 \end{bmatrix}, b = \begin{bmatrix} f(1) \\ \vdots \\ f(n) \end{bmatrix} \quad \text{Formula 6}$$

Here, if each of "A", "b" and "θ" satisfies the formula 6, the formula 5 can be expressed by the following formula.

$$A\theta = b \quad \text{Formula 7}$$

"A" and "b" are known values, whereas "θ" consists of independent four elements, so that the following condition is satisfied if "n" is 4 or more.

$$\theta = A^{-1} b \quad \text{Formula 8}$$

Therefore, elements "m" and "k" of "θ" can be acquired, so that a frequency of oscillation of the gripping force "fre" to be acquired can be derived through the following formula.

$$fre = \frac{1}{2\pi}\sqrt{\frac{k}{m}} \qquad \text{Formula 9}$$

Further, the frequency may be specified by using a parameter estimation method using a model other than the above. Further, if the number of counts "n" after determining the contact with the work is less than 4, an inverse matrix of "A" cannot be acquired by the formula 8. Therefore, the gripping operation is continued to a next control period without specifying the frequency.

Further, in step S26, the robot hand control device 500 determines whether an extreme value of the gripping force waveform of the frequency specified in step S25 is detected in the time history response of the value detected by the force sensor 351. The extreme value of the gripping force waveform refers to a local maximum value or a local minimum value when the waveform is assumed to be a sine wave. In other words, the robot hand control device 500 determines whether the local maximum value or the local minimum value of the gripping force waveform of the frequency specified in step S25 falls within the force control completion range. If the extreme value is determined to fall within the range (YES in step S26), the processing proceeds to step S27. If the extreme value is determined to fall outside the range (NO in step S26), the processing proceeds to step S28.

In step S27, the number of force control completion counts is registered from the time history response of the value detected by the force sensor 351. In the time history response of values detected by the force sensor 351, if a time at which the detection value consecutively falls within the force control completion range is expressed as "tr", and a control period of the robot hand control device 500 is expressed as "Ts", the number of force control completion counts can be acquired by tr/Ts. The number of force control completion counts is registered by updating the number of force control completion counts of the corresponding gripping instruction number described in the gripping instruction table 511 in FIG. 4. After the number of force control completion counts has been registered, the gripping operation and log-recording of the time history response of the force sensor value are stopped and ended.

If the number of force control completion counts falls outside the range specified thereto, the robot hand control device 500 notifies the user that the number of force control completion counts exceeds the specified range and ends the processing without updating the gripping instruction table 511.

In a case where the processing proceeds to step S28, the robot hand control device 500 takes a reciprocal of the frequency of oscillation specified in step S25 to acquire an oscillation cycle of the gripping force waveform. Then, the robot hand control device 500 continuously executes the gripping operation for a period longer than one-half of the acquired cycle but shorter than three-fourth of the acquired cycle. Because the extreme value appears in a period between one-half to three-fourth of the cycle of the waveform, certainty of detecting the extreme value can be increased by setting the duration of the gripping operation as described above.

After the gripping operation is continued in step S28, the processing returns to a starting state of step S24. Because the extreme value of the gripping force waveform cannot be detected within the force control completion range in step S26, the gripping operation is carried on for a period in which the extreme value can be detected. Through the above-described method, the number of force control completion counts can be set automatically.

The method will be described through the actual operation with reference to FIG. 9. In FIG. 9, when the time "t" satisfies "t=3 Ts[ms]", the detected gripping force exceeds 10% of the target gripping force, and contact with the work is determined in step S23.

When the time "t" satisfies "t=5 Ts[ms]", the detected gripping force is determined to fall within the force control completion range (YES in step S24). However, because the number of counts after determining contact with the work is less than 4 (in FIG. 9, 3 counts), the robot hand control device 500 continues the gripping operation to the next control period without specifying the frequency.

When the time "t" satisfies "t=6 Ts[ms]", the detected gripping force is determined to fall within the force control completion range (YES in step S24), and the frequency is acquired in step S25 because the number of counts after determining contact with the work is 4 or more. However, an extreme value of the gripping force waveform is determined to be undetected from the waveform (black dots) detected up to this point (NO in time in step S26). Therefore, in order to acquire the extreme value, the gripping operation is extended for a period expressed by white dots in step S28.

When the time "t" satisfies "t=7 Ts[ms]", the detected gripping force is determined to fall outside the force control completion range (NO in step S24), so that the processing returns to previous step of step S24.

When the time "t" satisfies "t=9 Ts[ms]", the detected gripping force is determined to fall within the force control completion range (YES in step S24), and the number of counts after determining contact with the work is 4 or more, so that the frequency is acquired in step S25. Although the extreme value of the gripping force waveform is detected from the waveform (black dots) detected up to this point in time (NO in step S26), the extreme value is determined to fall outside the force control completion range. Therefore, in order to acquire the extreme value falling within the force control completion range, the gripping operation is extended for a period expressed by white dots in step S28.

When the time "t" satisfies "t=12 Ts[ms]", the detected gripping force is determined to fall within the force control completion range (YES in step S24), and the number of counts after determining contact with the work is 4 or more, so that the frequency is acquired from the waveform in step S25. An extreme value of the gripping force waveform is detected from the waveform (black dots) detected up to this point in time (YES in step S26), and the extreme value is determined to fall within the force control completion range.

If a time at which the detection value consecutively falls within the force control completion range up to this point in time is expressed as "tr", and a control period of the robot hand control device 500 is expressed as "Ts", the number of force control completion counts can be acquired by tr/Ts (in FIG. 9, 4 counts). Thereafter, the number of force control completion counts is registered in step S27, and the gripping operation and log-recording of the time history response of the value detected by the force sensor 351 are stopped and ended.

Through the above-described processing, as to whether fluctuation of the gripping force falls within the optionallydefined force control completion range can be determined promptly, and the number of force control completion counts can be set automatically. Further, because continuation of the gripping operation is set to a period within a range in which the extreme value of the gripping force waveform can be detected with certainty, precision for determining the completion of force control can be improved.

Further, it is possible to reduce fluctuation of the gripping force arising when the gripping control for only executing the force control is switched to the gripping control for only executing the position control. Therefore, time taken for executing the processing for shifting the force control to the position control is not required, so that the work can be conveyed immediately after being gripped. With this configuration, the work can be gripped with a certain gripping force while being positioned, and rapidly conveyed and assembled after being gripped.

In the first exemplary embodiment, a robot hand having two fingers has been described. However, the present disclosure is also applicable to a robot hand having three fingers. A second exemplary embodiment will be described below in detail.

A configuration of a robot system 100 in the second present exemplary embodiment is similar to the configuration described in the first exemplary embodiment with reference to FIG. 1. Therefore, the same reference numerals are applied to the components similar to or corresponding to those in the first exemplary embodiment, and description thereof will be omitted or simplified while points different from the first exemplary embodiment will be mainly described.

In the present exemplary embodiment, similar to the first exemplary embodiment illustrated in FIG. 1, the robot system 100 is used, and a below-described robot hand main body 300' is used in place of the robot hand main body 300. More specifically, the robot system 100 includes a robot arm main body 200, a robot hand main body 300', a robot arm control device 600', and a robot hand control device 500'. Similarly, a work W1 as an assembling part is placed on a work placement table S1, and a work W2 as an assembling target object to which the work W1 is assembled is fixed to a work fixing table S2. For example, the present exemplary embodiment is applicable to a case where the work W1 is gripped by the robot arm main body 200 by using the robot hand main body 300', and the operation is shifted to the conveyance operation.

Because the present exemplary embodiment is different from the first exemplary embodiment in the robot hand main body 300' and the robot hand control device 500', the robot hand main body 300' and the robot hand control device 500' will be described below.

Figure 10:
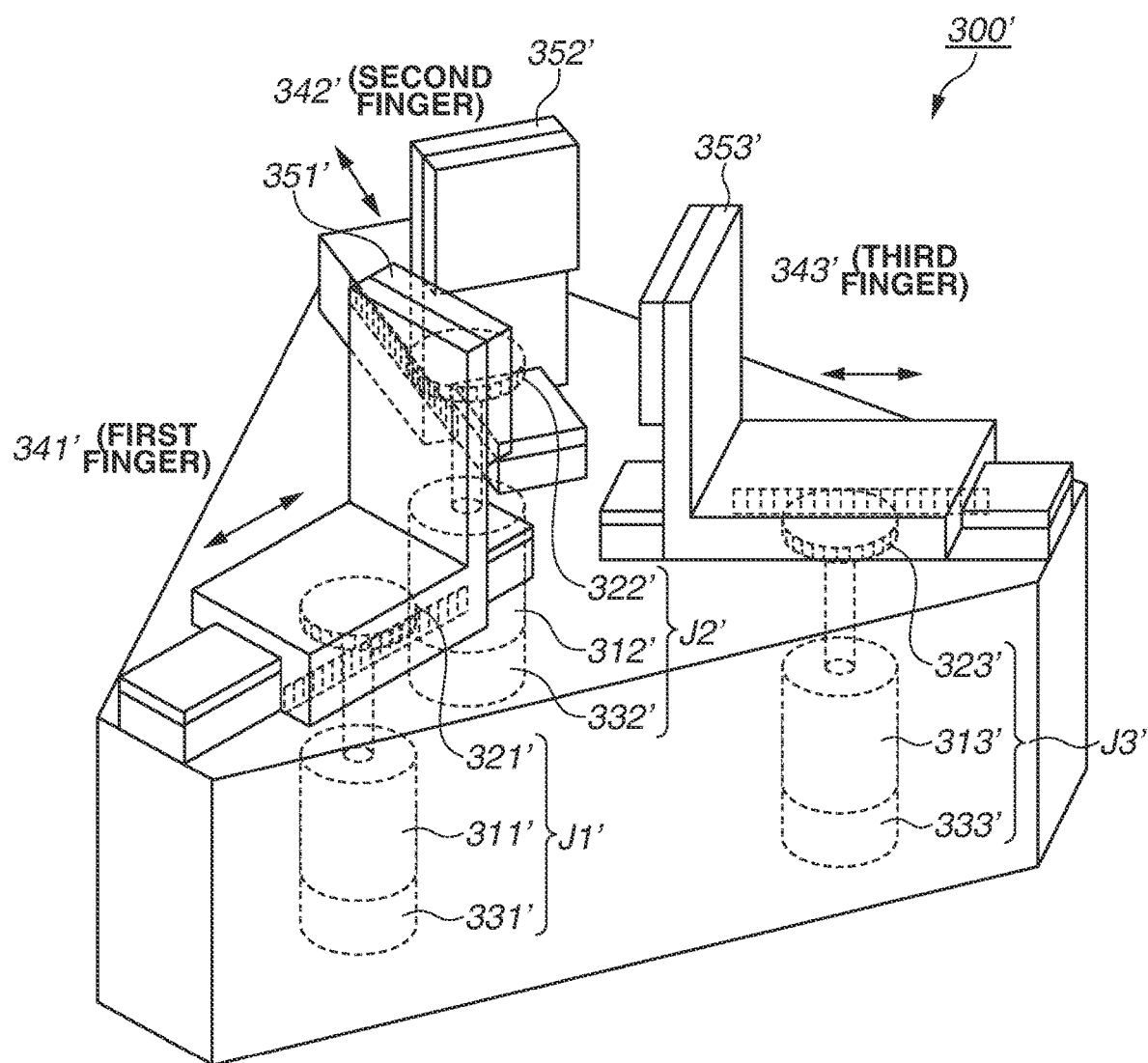
FIG. 10 is a diagram illustrating a schematic configuration of a robot hand according to one or more aspects of the present disclosure.

FIG. 10 is a diagram illustrating a schematic configuration of the robot hand main body 300'. The robot hand main body 300' includes three fingers and opening/closing driving mechanisms J1', J2', and J3' having 3-degree of freedom in total. The fingers are equally and mutually arranged at an angle of 120-degree. Each of the fingers includes one of the opening/closing driving mechanism J1', J2', or J3', and is used for gripping the work W1. Motors 311', 312', and 313' serving as driving units for respectively driving the opening/closing driving mechanisms J1', J2', and J3' are arranged on the opening/closing driving mechanisms J1', J2', and J3' of the robot hand main body 300'. The fingers are driven via gears 321', 322', and 323' directly connected to the motors 311', 312', and 313'. Further, encoders 331', 332', and 333' for detecting rotation angles of the motors 311', 312', and 313' are arranged on the motors 311', 312', and 313'. Further, force sensors 351', 352', and 353' are arranged on leading ends of the respective fingers, so that external force in a gripping direction applied to each of the fingers can be detected thereby.

Further, similar to the first exemplary embodiment, in the robot system control apparatus 400' in FIG. 1, the robot hand control device 500' includes a CPU, a ROM, a RAM, and a general purpose signal interface. However, content of the control program and the gripping instruction table 511' stored in the ROM are different from those described in the first exemplary embodiment.

Figure 11:
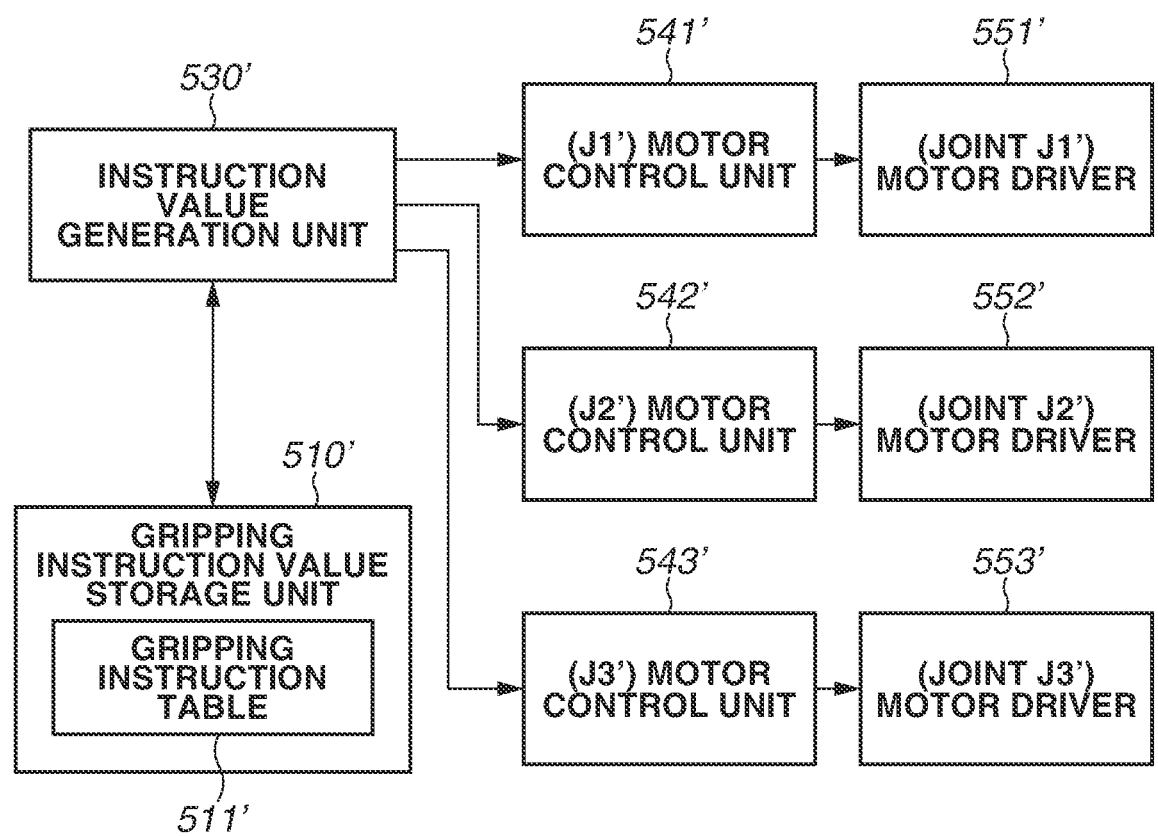
FIG. 11 is a block diagram illustrating general control of a robot hand control device according to one or more aspects of the present disclosure.

FIG. 11 is a diagram illustrating a schematic configuration of the robot hand control device 500' according to the present exemplary embodiment. In a simple term, the configuration is different from that of the first exemplary embodiment in that a function for controlling the opening/closing driving mechanism J3 is added thereto. A control structure of the robot hand control device 500' includes an instruction value generation unit 530', motor control units 541', 542', and 543', and motor drivers 551', 552', and 553'. Based on a gripping instruction and the gripping instruction table 511', the instruction value generation unit 530' provides control parameters for controlling the respective motors 311', 312', and 313' to the motor control units 541', 542', and 543'. The control parameters in this case include an opening/closing driving mechanism control mode, a target gripping position, a target gripping force, a force control completion range, and a number of force control completion counts.

In addition, the target gripping position is provided to each of the motor control units 541', 542', and 543' if the opening/closing driving mechanism control mode of each of the motors 311', 312', and 313' is the position control. Further, if the opening/closing driving mechanism control mode of each of the motors 311', 312', and 313' is the force control, the target gripping force, the force control completion range, and the number of force control completion counts are provided to each of the motor control units 541', 542', and 543'.

In the present exemplary embodiment, any one of the position control and the force control can be selected for each of the motors 311', 312', and 313'. The motor control units 541', 542', and 543' of the motors 311', 312', and 313' provide control values of the respective motors 311', 312', and 313' to the motor drivers 551', 552', and 553' according to the opening/closing driving mechanism control mode provided by the instruction value generation unit 530'.

Functions of the motor control units 541', 542' and 543' are similar to each other, and when attention is given to the motor control unit 541', the configuration and the operation thereof are similar to those of the first exemplary embodiment illustrated in FIG. 3.

Subsequently, the gripping instruction table 511' in FIG. 12 will be described. The gripping instruction table 511' is different from the gripping instruction table 511 of the first exemplary embodiment illustrated in FIG. 4 in that parameters relating to the position control or the force control are set for the opening/closing driving mechanisms J1', J2', and J3'.

In other words, in the gripping instruction table 511', an opening/closing driving mechanism control mode, a gripping form, and respective items such as a target gripping position, a target gripping force, a force control completion range, and a number of force control completion counts of each of the opening/closing driving mechanisms J1', J2', and J3' are set at each of the gripping instruction numbers. In the present exemplary embodiment, any one of the following eight types is set as the opening/closing driving mechanism control mode. In other words, the opening/closing driving mechanism control mode may be any one of the eight types, i.e., [PPP], [FPP], [PFP], [PPF], [FFP], [FPF], [PFF], and [FFF], and various kinds of controls are executable by using the three gripping fingers.

Here, gripping processing method of the work W1 executed by the robot hand control device 500' in the present exemplary embodiment will be described. As a prerequisite, it is assumed that the processing is started in a state where the robot arm main body 200 and the robot hand main body 300' are moved to a position just before a gripping position of the work W1. After the processing is started, the robot hand control device 500' executes the force control of all of the fingers to grip the work W1 through the gripping processing described below.

Similar to the first exemplary embodiment, the robot hand control device 500' described above executes the procedure of gripping processing according to the block diagram in FIG. 5 and the flowchart in FIG. 6. However, the processing in respective steps different from the first exemplary embodiment will be described in detail.

First, in step S11, the robot hand control device 500' switches the control switching unit 548 of each finger to the contact point 1 and executes force control. A gripping force control value output from the force control unit 547 of each finger is used as the control value output from the control switching unit 548 of each finger.

In step S12, the force control unit 547 of each finger determines whether a difference between the gripping force control value and a value detected by the force sensor consecutively falls within a range for a predetermined number of times. Here, each of the fingers has a different target gripping force, a force control completion range, and a number of force control completion counts. Therefore, if all of detection values of the force sensors arranged on the respective fingers fall within the ranges (YES in step S12), the force control is determined to be completed, and the completion determination signals are shifted to ON and output from the force control units 547 of the respective fingers. Then, the processing proceeds to step S13. If not all of detection values of the force sensors arranged on the fingers fall within the ranges (NO in step S12), the processing returns to step S11.

In step S13, after the completion determination signal is shifted to ON, the storage unit 549 stores the gripping force control value output from the force control unit 547 of each finger in the RAM. In the present exemplary embodiment, the gripping force control values of three fingers are stored.

In step S14, the robot hand control device 500' switches the control switching unit 548 to the contact point 2 and executes the position control. The target gripping position of the position control unit 546 at that time is switched to the current position detected by the encoder 331', 332', or 333' when the completion determination signal is shifted to ON. Further, the control value output from the control switching unit 548 is a value input to the contact point 2, i.e., a sum of the gripping force control value stored in each of the storage units 549 and the gripping position control value output from each of the position control units 546. Further, because the fluctuation of the gripping force is decreased to a level within a predetermined force completion range, a timing at which the processing is shifted to step S14 can be regarded as a timing at which the gripping control is completed. Through the above-described control, the control can be switched to the gripping control for executing the position control while the force is applied to the gripping portion.

In addition, similar to the first exemplary embodiment, although the number of force control completion counts described in the gripping instruction table 511' may be set by the user, the number thereof can be automatically set by the following method.

Figure 8:
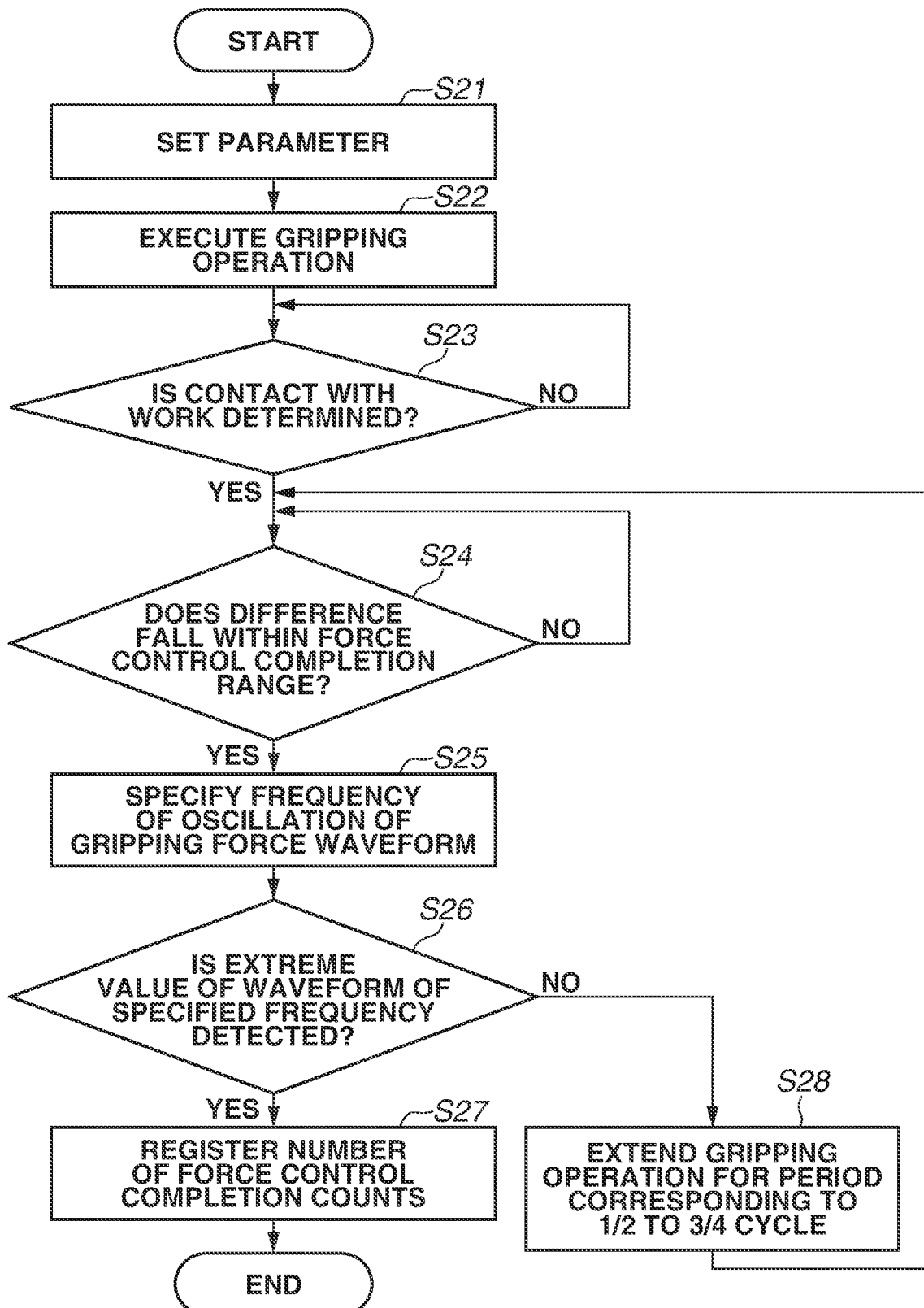
FIG. 8 is a flowchart illustrating an automatic setting method of a number of force control completion counts according to one or more aspects of the present disclosure.
Figure 9:
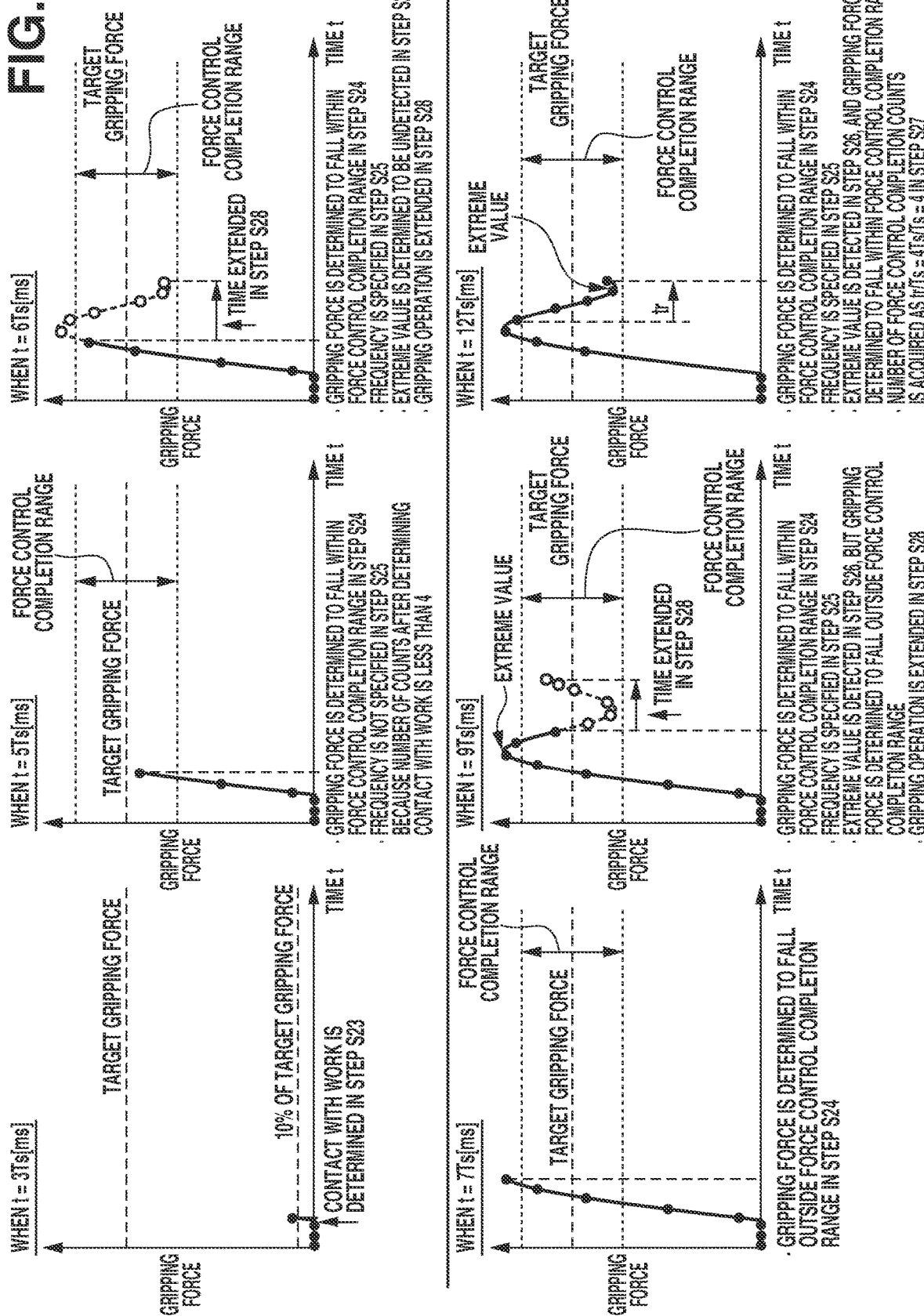
FIG. 9 is a diagram chronologically illustrating a time history response of a gripping force for gripping a target object according to one or more aspects of the present disclosure.

Basically, similar to the first exemplary embodiment, a method of automatically setting the number of force control completion counts is executed according to the flowchart in FIG. 8. The setting method thereof is different from that of the first exemplary embodiment in that the number of force control completion counts is set to each of the fingers, and that the processing in step S23 and subsequent steps is executed for each of the fingers. The number of force control completion counts can be automatically set through the flowchart in FIG. 8 while taking the above differences into consideration.

As described above, according to the robot hand control device 500' of the present exemplary embodiment, even if the gripping portion has three fingers, it is possible to reduce the fluctuation of the gripping force arising when the gripping control is switched to the gripping control for only executing the position control. Therefore, time taken for executing the processing for shifting the force control to the position control is not required, so that the work can be conveyed immediately after being gripped. With this configuration, even if the number of fingers arranged on the gripping portion is changed, the work can be gripped with a certain gripping force while being positioned, and rapidly conveyed and assembled after being gripped. Further, the work can be stably gripped, conveyed, and assembled by a plurality of gripping fingers.

In the above-described first and the second exemplary embodiments, the gripping force control value output from the force control unit 547 at the time of completing the force control is stored every time the work is gripped. In a third exemplary embodiment of the present disclosure, the gripping force control value stored once can be used for the next work.

Hereinafter, the same reference numerals are applied to the configurations similar to or corresponding to the configurations of the first exemplary embodiment, and descriptions thereof will be omitted or simplified and points different from the first exemplary embodiment will be mainly described.

In the present exemplary embodiment, similar to the first exemplary embodiment, the robot system 100 is used. More specifically, the robot system 100 includes a robot arm main body 200, a robot hand main body 300, a robot system control apparatus 400", a robot hand control device 500", and a robot arm control device 600".

Similarly, a work W1 as an assembling part is placed on a work placement table S1, and a work W2 as a assembling target object is fixed to a work fixing table S2. For example, the present exemplary embodiment is applicable to a case where the work W1 is gripped by the robot arm main body 200 by using the robot hand main body 300, and the operation is shifted to the conveyance operation.

The present exemplary embodiment is different from the first exemplary embodiment in the robot hand control device 500". Further, similar to the first exemplary embodiment, the robot hand control device 500" includes a CPU, a ROM, a RAM, and a general purpose signal interface. The present exemplary embodiment is different from the first exemplary embodiment with respect to the information stored in the ROM and the RAM. A control program of the robot hand main body 300 for realizing the below-described gripping processing in the present exemplary embodiment is stored in the ROM.

Figure 13:
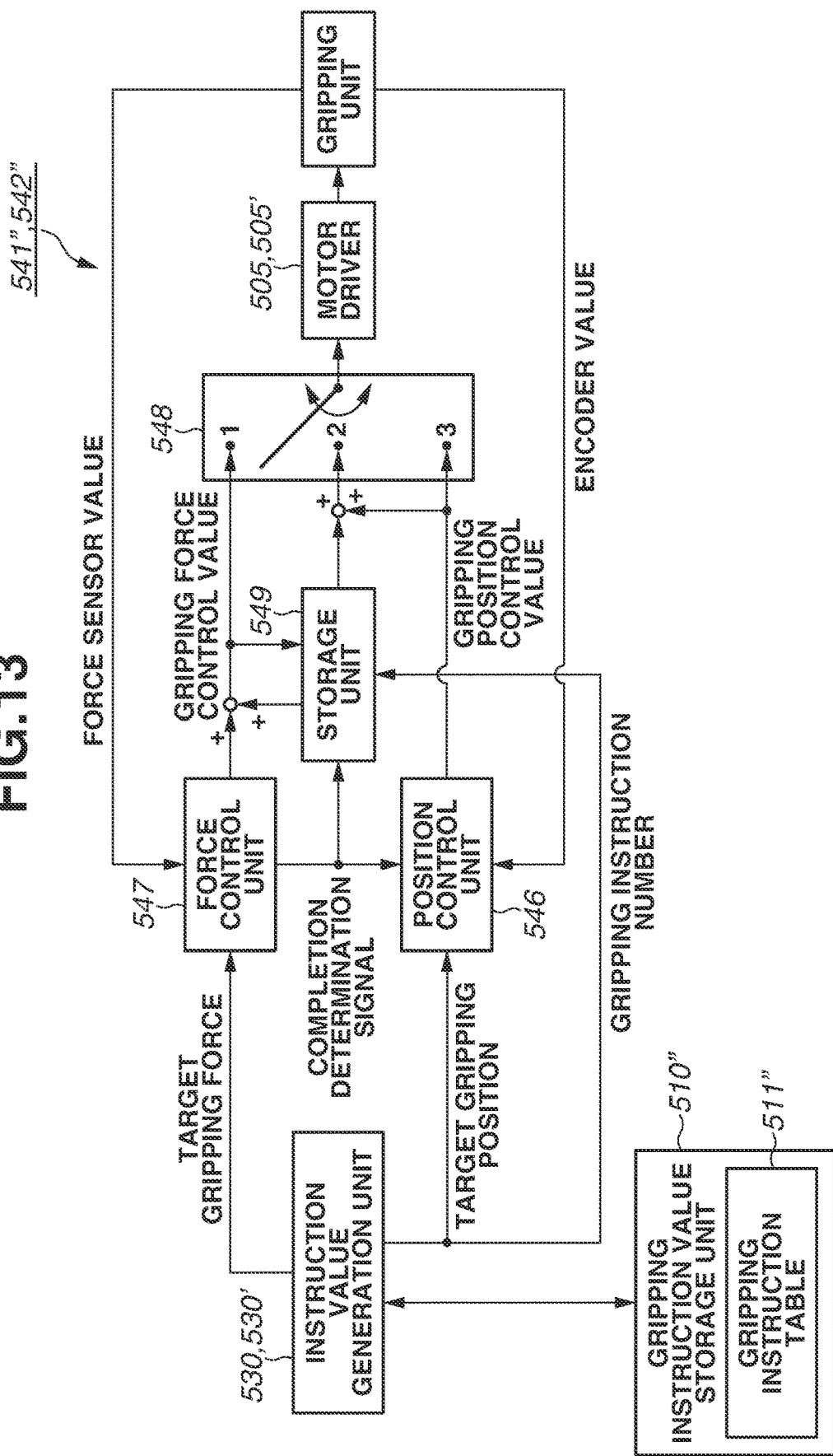
FIG. 13 is a block diagram of a motor control unit according to one or more aspects of the present disclosure.

A control structure of the robot hand control device 500" of the present exemplary embodiment is different from that of the first exemplary embodiment in that the functions of the motor control units 541 and 542 are changed. Functions of motor control units 541" and 542" in the present exemplary embodiment are similar to each other, so that a block diagram of the motor control unit 541" of the opening/closing driving mechanism J1 is illustrated in FIG. 13 as an example.

Portions different from the configuration described in the first exemplary embodiment will be described with reference to FIG. 13. When the completion determination signal output from the force control unit 547 becomes ON, the storage unit 549 stores a gripping force control value output from the force control unit 547 at that time in association with the gripping instruction number based on the below-described gripping processing procedure.

Based on the control mode for the motor 311 and the gripping processing procedure, the control switching unit 548 selects any one of the contact point 3 connected with the position control unit 546, the contact point 1 connected with the force control unit 547, and the contact point 2 connected with the position control unit 546 and the storage unit 549.

If the contact point of the control switching unit 548 is switched to the contact point 1, the gripping force control value received from the force control unit 547 is output from the control switching unit 548, and force control is executed.

If the contact point of the control switching unit 548 is switched to the contact point 2, similar to the first exemplary embodiment, a sum of the gripping position control value from the position control unit 546 and the gripping force control value from the storage unit 549 is output from the control switching unit 548, and position control is executed.

If the contact point of the control switching unit 548 is switched to the contact point 3, similar to the first exemplary embodiment, the gripping position control value received from the position control unit 546 is output from the control switching unit 548, and the position control of the gripping finger is executed.

By executing the above-described control, when the force control for applying the target gripping force to the gripping finger is switched to the position control for setting the gripping finger to the target position, the control can be switched to the gripping control for only executing the position control while maintaining the gripping force control value (i.e., gripping force) immediately before executing switching.

Here, a gripping processing method of the work W1 executed by the robot hand control device 500" according to the present exemplary embodiment will be described. As a prerequisite, similar to the first exemplary embodiment, it is assumed that the processing is started in a state where the robot arm main body 200 and the robot hand main body 300 are moved to a position immediately before a gripping position of the work W1. Further, it is assumed that the second finger has already been positioned, and the gripping finger 341 as the first finger grips the work W1 through the force control executed by the gripping processing described below.

A procedure of executing the gripping processing by the above-described robot hand control device 500" will be described with reference to the flowchart in FIG. 14. For example, the gripping processing will be described for a case where the work W1 is gripped twice according to the gripping instruction number 3 described in the gripping instruction table 511.

First, in step S31, the robot hand control device 500" determines whether the processing is to be executed according to a different gripping instruction number, or whether a gripping force control value is to be newly stored. In the gripping instruction table 511 stored in the gripping instruction value storage unit 510, as to whether to newly store the gripping control value is described as a relative setting value necessary for controlling the robot hand 300. If the processing is to be executed according to a different gripping instruction number, or a gripping force control value is to be newly stored (YES in step S31), the processing proceeds to step S32. In other cases, the processing proceeds to step S36.

In step S32, the robot hand control device 500" switches the control switching unit 548 to the contact point 1 and executes the force control. According to the gripping instruction number 3, the target gripping force is 5N. A sum of the gripping force control value output from the force control unit 547 and the gripping force control value output from the storage unit 549 is used as the control value output from the control switching unit 548.

However, at this time, because the gripping force control value is not stored in the storage unit 549, "0" is output from the storage unit 549 as the gripping force control value. As a result, only the gripping force control value output from the force control unit 547 is used as the control value output from the control switching unit 548.

In step S33, the force control unit 547 determines whether a difference between the target gripping force and a value detected by the force sensor 351 consecutively falls within a range for a predetermined number of times. According to the gripping instruction number 3, the force control completion range is 1N, and the number of force control completion counts is 3. Thus, the force control unit 547 determines whether a difference between the target gripping force and the value detected by the force sensor 351 falls within a range (force control completion range) of ±1N for consecutive three control periods (a number of force control completion counts). If the difference with the detection value detected by the force sensor 351 falls within the above-described range for a predetermined number of times (YES in step S33), the force control is determined to be completed, and a completion determination signal is shifted to ON and output from the force control unit 547. Then, the processing proceeds to step S34. If the difference does not fall within the range (NO in step S33), the processing returns to step S32.

In step S34, after the completion determination signal is shifted to ON, the gripping force control value output from the force control unit 547 is stored in the storage unit 549 in association with the gripping instruction number at that time. In the present exemplary embodiment, the gripping force control value is stored in association with the gripping instruction number 3.

In step S35, the control switching unit 548 is switched to the contact point 2, and the position control is executed. At this time, the target gripping position of the position control unit 546 is switched to the current position detected by the encoder when the completion determination signal is shifted to ON. Further, a control value output from the control switching unit 548 is a value input to the contact point 2, i.e., a sum of the gripping force control value stored in the storage unit 549 in association with the gripping instruction number 3 and the gripping position control value output from the position control unit 546. Further, because the fluctuation of the gripping force is small, a timing at which the processing is shifted to step S35 can be regarded as a timing at which the gripping control is completed.

Further, in step S36, the robot hand control device 500" switches the control switching unit 548 to the contact point 1 and executes the force control. According to the gripping instruction number 3, the target gripping force is 5N. A sum of the gripping force control value output from the force control unit 547 and the gripping force control value output from the storage unit 549 is used as the control value output from the control switching unit 548.

At this time, the gripping force control value stored in the storage unit 549 in association with the gripping instruction number 3 is output from the storage unit 549.

In step S37, the force control unit 547 determines whether a difference between the gripping force control value and a value detected by the force sensor 351 consecutively falls within a range for a predetermined number of times. If the difference falls within the above-described range (YES in step S37), the force control is determined to be completed, and a completion determination signal is shifted to ON and output from the force control unit 547. Then, the processing proceeds to step S35. If the difference does not fall within the range (NO in step S37), the processing returns to step S36.

Figure 15:
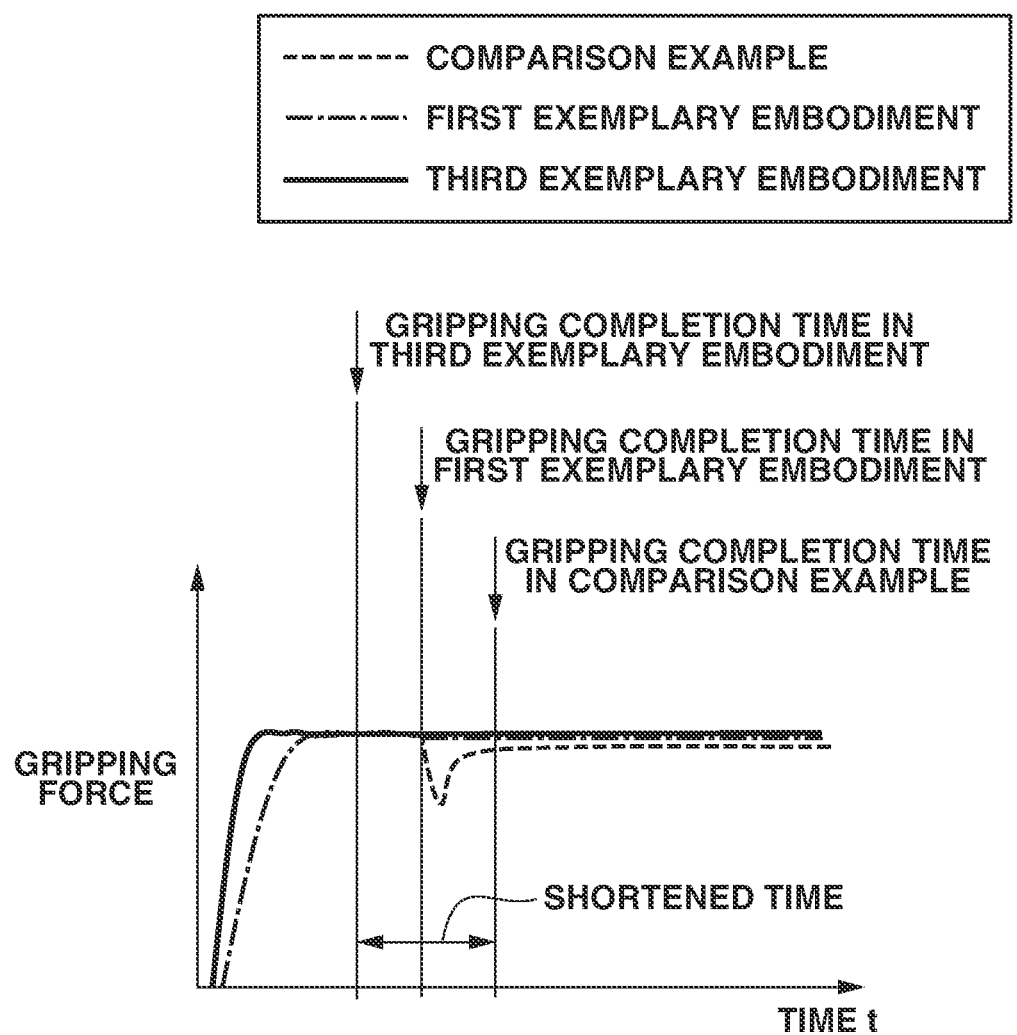
FIG. 15 is a graph illustrating a time history response of a gripping force according to one or more aspects of the present disclosure.

FIG. 15 is a graph illustrating a time history response of the gripping force in the first and third exemplary embodiment and a comparison example. Herein, the first exemplary embodiment corresponds to a case where the processing is executed according to the gripping instruction number 3 in a state where the robot hand has not been operated according to the gripping instruction number 3 before. In other words, the gripping processing proceeds to step S32 through the determination in step S31 and the gripping processing is performed. The third exemplary embodiment corresponds to a case where the processing is executed according to the gripping instruction number 3 in a state where the robot hand has already been operated according to the gripping instruction number 3. In other words, the gripping processing proceeds to step S36 through determination in step S31 and the gripping processing is performed.

Figure 14:
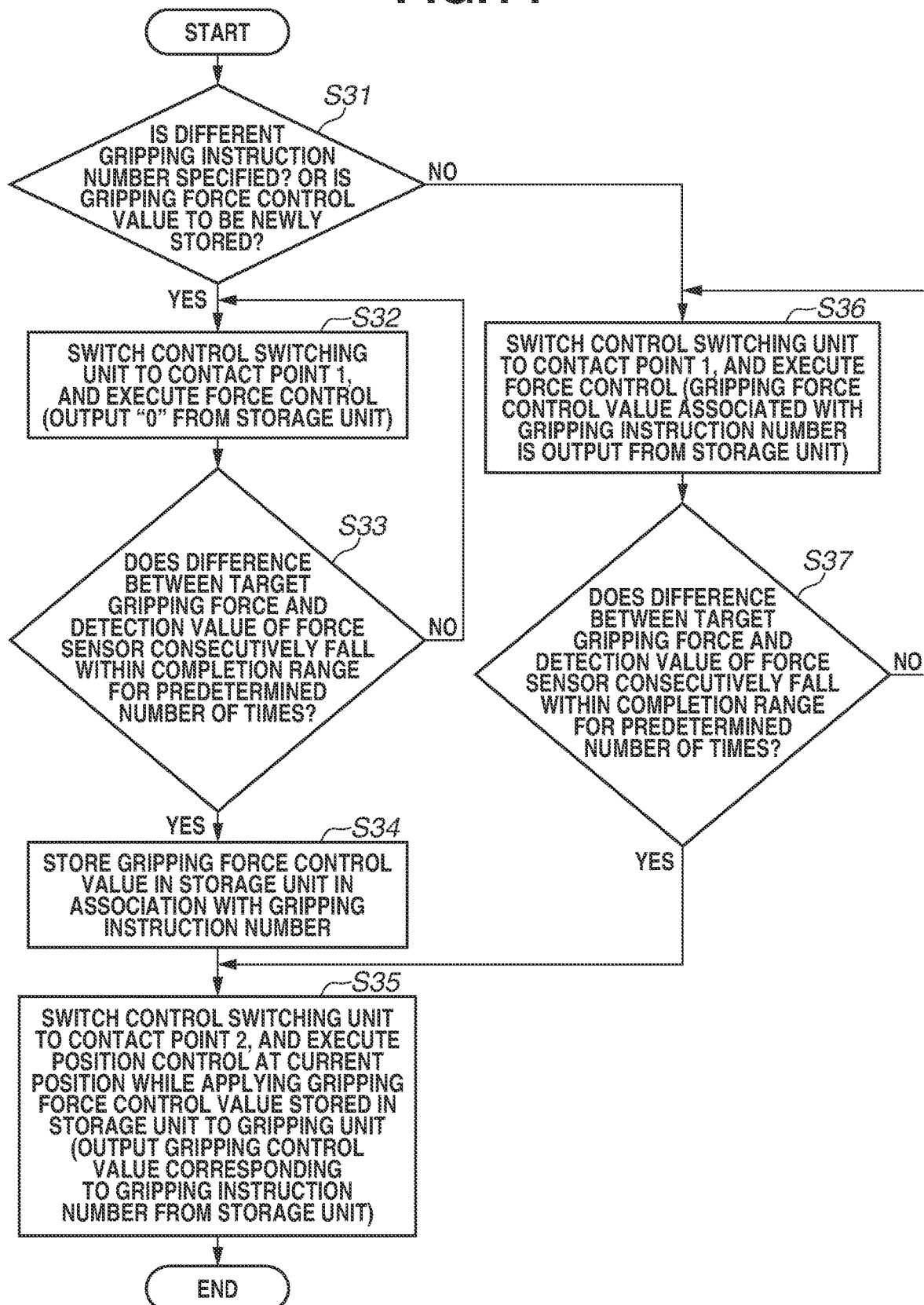
FIG. 14 is a flowchart illustrating a procedure of gripping processing according to one or more aspects of the present disclosure.

On the other hand, the comparison example corresponds to a case where the processing in step S34 in FIG. 14 is skipped, and the contact point is switched to the contact point 3 instead of the contact point 2 in step S35. In other words, the gripping control for executing the force control is simply switched to the gripping control for only executing the position control.

As illustrated in FIG. 15, in the first and the third exemplary embodiments, time taken for completing the gripping control can be reduced comparing to the comparison example. In the comparison example, in a period immediately after the force control is switched to the position control, the gripping position control value becomes 0 because the deviation of the position control is 0. Therefore, a tip of the gripping finger is pushed back because of the rigidity of the work, so that change arises in the gripping force. Therefore, although the position control unit 546 functions to return to the original position, it will take time to set the deviation to 0 to complete the gripping operation.

On the other hand, in the first exemplary embodiment, because the force control can be shifted to the position control while continuously applying force thereto, change in gripping force can be reduced, and gripping control can be completed within a short period of time. Further, in the third exemplary embodiment, when the force control is executed in step S36, the gripping force control value associated with the gripping instruction number 3 is applied as a feedforward. Therefore, a response of the force control can be settled quickly, and thus the gripping control can be completed faster than the first exemplary embodiment. Because the motor 311 or the gear 321 serving as a driving unit of the robot hand main body 300 is degraded over years because of friction, it has been difficult to previously acquire a feedforward amount through calculation. However, the feedforward amount can be acquired through the gripping processing illustrated in FIG. 14.

Further, although the number of force control completion counts described in the gripping instruction table 511 may be set by the user, the number thereof can be automatically set by the method similar to the method described in the first exemplary embodiment.

Furthermore, gripping force control values corresponding to various works may be stored in the storage unit 549 in association with each other, and gripping control may be executed as described above.

As described above, the robot hand control device 500" of the present exemplary embodiment can reduce the gripping force fluctuation arising when control of the gripping finger is switched from the force control to the position control. Therefore, time taken for executing the processing for shifting the force control to the position control is not required, so that the work can be conveyed immediately after being gripped. Furthermore, because the gripping instruction number that has been already executed is stored in association with the gripping force control value, time taken for executing the gripping processing at the second time and later can be reduced. With this configuration, the work can be gripped with a certain gripping force while being positioned, and rapidly conveyed and assembled after being gripped.

Further, specifically, the gripping processing procedures described in the first, the second, and the third exemplary embodiments are executed through the robot hand control devices 500, 500', and 500". Accordingly, a storage medium storing a program of software for realizing the above-described function is supplied to the robot hand control device 500, 500', or 500", and the CPU may read and execute the program stored in the storage medium to achieve the exemplary embodiments of the present disclosure. In this case, the program itself read from the storage medium realizes the functions described in the above exemplary embodiments, and thus the program itself and the storage medium storing that program constitute the present disclosure.

Further, in the present exemplary embodiment, although the program is stored in the ROM or the RAM serving as a computer-readable storage medium, the present disclosure is not limited thereto. The program for realizing the present disclosure can be stored in a storage medium of any type as long as the storage medium is a computer-readable storage medium. For example, a hard disk drive (HDD), an external storage device, or a recording disk may be used as the recording medium for supplying the program.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-107063, filed May 30, 2017, which is hereby incorporated by reference herein in its entirety.

What is claimed is:

1. A robot hand for gripping a target object with a plurality of gripping portions, comprising:
    a driving source configured to drive the plurality of gripping portions;
    a force control unit configured to control a gripping force of the gripping portions based on a gripping force control value;
    a position control unit configured to control a gripping position of the gripping portions based on a gripping position control value;
    a control switching unit configured to switch between force control executed by the force control unit and position control executed by the position control unit; and
    a storage unit configured to store the gripping force control value before the force control is switched to the position control,
    wherein, when the control switching unit switches the force control to the position control, the gripping position control value is applied to the driving source in a state where the gripping force control value before the force control is switched to the position control is applied to the driving source.

2. The robot hand according to claim 1, further comprising a detection unit configured to detect the gripping force,
    wherein the force control unit determines that force control is completed in a case where the gripping force detected by the detection unit consecutively falls within a predetermined threshold range for a predetermined number of times, and
    wherein, when the control switching unit switches the force control to the position control, the gripping position control value is applied to the driving source in a state where the gripping force control value at which the force control is determined to be completed is applied to the driving source.

3. The robot hand according to claim 2, wherein, as determination of completion of the force control, when the gripping portions contact the target object, the force control unit determines whether an extreme value of the gripping force detected by the detection unit falls within the threshold range based on a waveform of a time history response of the gripping force detected by the detection unit.

4. The robot hand according to claim 3,
    wherein the force control unit counts a number of times of detection by the detection unit from when the gripping force detected by the detection unit falls within the threshold range until the extreme value falls within the threshold range, and uses the counted number for determination of completion of the force control.

5. A robot apparatus comprising a robot arm having a robot hand for gripping a target object with a plurality of gripping portions,
    wherein the robot hand includes
    a driving source configured to drive the plurality of gripping portions;
    a force control unit configured to control a gripping force of the gripping portions based on a gripping force control value;
    a position control unit configured to control a gripping position of the gripping portions based on a gripping position control value;
    a control switching unit configured to switch between force control executed by the force control unit and position control executed by the position control unit; and
    a storage unit configured to store the gripping force control value before the force control is switched to the position control,
    wherein, when the control switching unit switches the force control to the position control, the gripping position control value is applied to the driving source in a state where the gripping force control value before the force control is switched to the position control is applied to the driving source.

6. A control method of a robot hand including a force control unit configured to control a gripping force of gripping portions based on a gripping force control value, a position control unit configured to control a gripping position of the gripping portions based on a gripping position control value, and a control switching unit configured to switch between force control executed by the force control unit and position control executed by the position control unit, the control method comprising:
    storing, in a storage unit, a gripping force control value output from the force control unit immediately before switching; and
    applying the gripping position control value to the driving source in a state where the gripping force control value before the force control is switched to the position control is applied to the driving source, and switching the force control to the position control.

7. The control method of the robot hand according to claim 6,
    wherein the robot hand includes a detection unit for detecting the gripping force, and
    wherein the force control unit determines that force control is completed in a case where the gripping force detected by the detection unit consecutively falls within a predetermined threshold range for a predetermined number of times,
    wherein the storage unit stores the gripping force control value at which the force control is determined to be completed, and
    wherein, when the control switching unit switches the force control to the position control, the gripping position control value is applied to the driving source in a state where the gripping force control value at which the force control is determined to be completed is applied to the driving source.

8. The control method of the robot hand according to claim 7, wherein, as determination of completion of the force control, when the gripping portions contact the target object, the force control unit determines whether an extreme value of the gripping force detected by the detection unit falls within the threshold range based on a waveform of a time history response of the gripping force detected by the detection unit.

9. A non-transitory computer readable storage medium storing a program for executing a control method of the robot hand including a force control unit configured to control a gripping force of gripping portions based on a gripping force control value, a position control unit configured to control a gripping position of the gripping portions based on a gripping position control value, a position control unit configured to control a gripping position of the gripping portions based on a gripping position control value, and a control switching unit configured to switch between force control executed by the force control unit and position control executed by the position control unit, the control method comprising:

storing, in a storage unit, a gripping force control value output from the force control unit immediately before switching; and applying the gripping position control value to the driving source in a state where the gripping force control value before the force control is switched to the position control is applied to the driving source, and switching the force control to the position control.

10. The robot hand according to claim 4, wherein in a case where the force control unit does not confirm that the extreme value falls within the threshold range, the force control unit obtains a frequency from the waveform, obtains a cycle from the frequency, and continues a gripping operation for a period longer than one-half of the cycle and shorter than three-fourth of the cycle.

11. A method of manufacturing an article, wherein an article is manufactured using a robot apparatus comprising a robot arm having a robot hand for gripping a target object with a plurality of gripping portions, wherein the robot hand includes a driving source configured to drive the plurality of gripping portions;

a force control unit configured to control a gripping force of the gripping portions based on a gripping force control value;

a position control unit configured to control a gripping position of the gripping portions based on a gripping position control value;

a control switching unit configured to switch between force control executed by the force control unit and position control executed by the position control unit; and a storage unit configured to store the gripping force control value before the force control is switched to the position control, wherein, when the control switching unit switches the force control to the position control, the gripping position control value is applied to the driving source in a state where the gripping force control value before the force control is switched to the position control is applied to the driving source.

* * * * *